US007657759B2

(12) United States Patent
Rubin et al.

(10) Patent No.: US 7,657,759 B2
(45) Date of Patent: Feb. 2, 2010

(54) METHOD AND SYSTEM FOR COPY PROTECTION OF DISPLAYED DATA CONTENT

(75) Inventors: Moshe Rubin, Jerusalem (IL); Daniel Schreiber, Beit Shemesh (IL)

(73) Assignee: Finjan Software, Ltd., Netanya (IL)

( * ) Notice: Subject to any disclaimer, the term of this patent is extended or adjusted under 35 U.S.C. 154(b) by 152 days.

(21) Appl. No.: 11/169,823

(22) Filed: Jun. 28, 2005

(65) Prior Publication Data

US 2005/0240759 A1 Oct. 27, 2005

Related U.S. Application Data

(63) Continuation of application No. 09/996,623, filed on Nov. 28, 2001, now Pat. No. 6,993,662, which is a continuation-in-part of application No. 09/774,236, filed on Jan. 29, 2001, which is a continuation-in-part of application No. 09/397,331, filed on Sep. 14, 1999, now Pat. No. 6,298,446.

(51) Int. Cl.
*G06F 12/14* (2006.01)
*G09G 5/36* (2006.01)
*G09G 5/22* (2006.01)

(52) U.S. Cl. ...................... 713/193; 345/551
(58) Field of Classification Search ................. 713/193; 345/551
See application file for complete search history.

(56) References Cited

U.S. PATENT DOCUMENTS

| 4,405,829 | A |   | 9/1983  | Rivest et al. |
|-----------|---|---|---------|---------------|
| 4,586,811 | A |   | 5/1986  | Kubo et al. |
| 4,827,508 | A |   | 5/1989  | Shear |
| 4,977,594 | A |   | 12/1990 | Shear |
| 4,991,118 | A | * | 2/1991  | Akiyama et al. ............ 715/209 |
| 5,012,232 | A |   | 4/1991  | Fadem ........................ 345/25 |
| 5,050,213 | A |   | 9/1991  | Shear |
| 5,300,946 | A |   | 4/1994  | Patrick ....................... 345/592 |
| 5,303,370 | A |   | 4/1994  | Brosh et al. |
| 5,410,598 | A |   | 4/1995  | Shear |
| 5,454,067 | A |   | 9/1995  | Tsai |
| 5,509,070 | A |   | 4/1996  | Schull |
| 5,533,124 | A |   | 7/1996  | Smith et al. |
| 5,559,933 | A |   | 9/1996  | Boswell |
| 5,570,306 | A |   | 10/1996 | Soo ............................ 708/212 |

(Continued)

FOREIGN PATENT DOCUMENTS

| EP | 1517215 A2   | 3/2005 |
| WO | WO 98/25373 | 6/1998 |
| WO | WO 98/44424 | 10/1998 |

OTHER PUBLICATIONS

Yergeau et al., "Internationalization of the Hypertext Markup Language", RFC 2070, Jan. 1997, Network Working Group.*

(Continued)

*Primary Examiner*—Ayaz R Sheikh
*Assistant Examiner*—Matthew T Henning
(74) *Attorney, Agent, or Firm*—King & Spalding LLP

(57) ABSTRACT

A method for altering text displayed in a formatted page, including locating a buffer of memory locations containing contents of a formatted page, locating a first text string between two markers within the buffer, the first string being an encrypted text including N characters, replacing the first text string with a second text string within the buffer, the second string being a decrypted text including M characters, where M is less than N, and inserting N-M special fill characters in the N-M unfilled memory locations between the markers within the buffer, so as to avoid the need to move the markers closer together.

23 Claims, 14 Drawing Sheets

U.S. PATENT DOCUMENTS

| | | | |
|---|---|---|---|
| 5,590,258 A * | 12/1996 | Aoyama | 715/531 |
| 5,636,292 A | 6/1997 | Rhoads | |
| 5,638,513 A | 6/1997 | Ananda | |
| 5,642,207 A | 6/1997 | Smitt | 358/474 |
| 5,710,834 A | 1/1998 | Rhoads | |
| 5,715,403 A | 2/1998 | Stefik | |
| 5,721,788 A | 2/1998 | Powell et al. | |
| 5,745,254 A | 4/1998 | Saton | 358/412 |
| 5,745,360 A | 4/1998 | Leone et al. | 715/236 |
| 5,745,604 A | 4/1998 | Rhoads | |
| 5,748,763 A | 5/1998 | Rhoads | |
| 5,748,783 A | 5/1998 | Rhoads | |
| 5,754,170 A | 5/1998 | Ranganathan | 345/558 |
| 5,758,068 A | 5/1998 | Brandt et al. | |
| 5,761,669 A | 6/1998 | Montague et al. | |
| 5,761,686 A | 6/1998 | Bloomberg | |
| 5,764,770 A | 6/1998 | Schipper et al. | 713/176 |
| 5,765,152 A | 6/1998 | Erickson | |
| 5,768,426 A | 6/1998 | Rhoads | |
| 5,778,372 A | 7/1998 | Cordell et al. | |
| 5,781,914 A | 7/1998 | Stork et al. | 715/234 |
| 5,790,117 A | 8/1998 | Halviatti et al. | 715/744 |
| 5,801,679 A | 9/1998 | McCain | |
| 5,801,689 A | 9/1998 | Huntsman | 715/733 |
| 5,805,724 A | 9/1998 | Metcalfe et al. | 382/176 |
| 5,809,160 A | 9/1998 | Powell et al. | |
| 5,822,432 A | 10/1998 | Moskowitz et al. | |
| 5,822,436 A | 10/1998 | Rhoads | |
| 5,832,119 A | 11/1998 | Rhoads | |
| 5,835,712 A * | 11/1998 | DuFresne | 709/203 |
| 5,835,722 A | 11/1998 | Bradshaw et al. | |
| 5,838,902 A | 11/1998 | Shin | |
| 5,841,886 A | 11/1998 | Rhoads | |
| 5,841,978 A | 11/1998 | Rhoads | |
| 5,850,481 A | 12/1998 | Rhoads | |
| 5,862,260 A | 1/1999 | Rhoads | |
| 5,870,544 A | 2/1999 | Curtis | |
| 5,872,915 A | 2/1999 | Dykes et al. | |
| 5,875,249 A | 2/1999 | Mintzer et al. | 380/54 |
| 5,875,296 A | 2/1999 | Shi et al. | 726/5 |
| 5,881,287 A | 3/1999 | Mast | |
| 5,892,900 A | 4/1999 | Ginter et al. | |
| 5,893,101 A | 4/1999 | Balogh et al. | 707/100 |
| 5,900,005 A | 5/1999 | Saito | |
| 5,901,277 A * | 5/1999 | Chu et al. | 358/1.15 |
| 5,905,505 A * | 5/1999 | Lesk | 345/630 |
| 5,920,848 A | 7/1999 | Schultzer et al. | |
| 5,954,028 A | 9/1999 | Miyashita et al. | 123/436 |
| 5,968,119 A | 10/1999 | Stedman et al. | 709/219 |
| 5,974,441 A | 10/1999 | Rogers et al. | |
| 5,982,931 A | 11/1999 | Ishimaru | |
| 5,983,227 A | 11/1999 | Nazem et al. | |
| 5,983,351 A | 11/1999 | Glogan | 726/26 |
| 5,986,676 A | 11/1999 | Dwin et al. | 345/544 |
| 5,991,399 A | 11/1999 | Graunke et al. | |
| 5,999,622 A | 12/1999 | Yasukawa et al. | 705/51 |
| 5,999,941 A | 12/1999 | Anderson | |
| 6,009,410 A | 12/1999 | LeMole et al. | |
| 6,011,905 A | 1/2000 | Huttenlocher et al. | |
| 6,014,702 A | 1/2000 | King et al. | |
| 6,032,150 A | 2/2000 | Nguyen | |
| 6,038,031 A | 3/2000 | Murphy | 382/254 |
| 6,052,780 A | 4/2000 | Glover | |
| 6,055,530 A | 4/2000 | Sato | 707/3 |
| 6,088,355 A | 7/2000 | Mills et al. | 370/392 |
| 6,119,108 A | 9/2000 | Holmes et al. | 705/40 |
| 6,121,970 A | 9/2000 | Guedalia | 715/760 |
| 6,154,844 A | 11/2000 | Touboul et al. | 726/24 |
| 6,178,243 B1 * | 1/2001 | Pomerantz et al. | 380/243 |
| 6,202,092 B1 | 3/2001 | Takimoto | 709/225 |
| 6,205,480 B1 | 3/2001 | Broadhurst et al. | |
| 6,209,036 B1 | 3/2001 | Aldred et al. | 709/229 |
| 6,209,103 B1 | 3/2001 | Schreiber et al. | |
| 6,212,329 B1 | 4/2001 | Sugahara | 386/94 |
| 6,236,387 B1 | 5/2001 | Imada | 715/236 |
| 6,240,450 B1 | 5/2001 | Sharples et al. | |
| 6,260,141 B1 | 7/2001 | Park | |
| 6,263,365 B1 | 7/2001 | Scherpbier | 709/218 |
| 6,275,599 B1 | 8/2001 | Adler et al. | 382/100 |
| 6,282,362 B1 | 8/2001 | Murphy et al. | 386/46 |
| 6,282,653 B1 | 8/2001 | Berstis et al. | |
| 6,289,137 B1 | 9/2001 | Sugiyama et al. | 382/299 |
| 6,298,422 B1 | 10/2001 | Spilo et al. | 711/154 |
| 6,298,446 B1 | 10/2001 | Schreiber et al. | |
| 6,314,409 B2 | 11/2001 | Schneck et al. | 705/54 |
| 6,324,569 B1 * | 11/2001 | Ogilvie et al. | 709/206 |
| 6,339,761 B1 | 1/2002 | Cottingham | 705/14 |
| 6,339,826 B2 | 1/2002 | Hayes, Jr. et al. | 713/166 |
| 6,343,274 B1 | 1/2002 | McCollom et al. | |
| 6,343,738 B1 | 2/2002 | Ogilvie | |
| 6,353,892 B2 | 3/2002 | Schreiber et al. | |
| 6,385,728 B1 | 5/2002 | DeBry | |
| 6,438,575 B1 | 8/2002 | Khan et al. | |
| 6,460,140 B1 | 10/2002 | Schoch et al. | 726/22 |
| 6,463,467 B1 | 10/2002 | Mages et al. | 709/218 |
| 6,470,450 B1 | 10/2002 | Langford et al. | 713/182 |
| 6,480,959 B1 | 11/2002 | Granger et al. | 713/189 |
| 6,487,543 B1 * | 11/2002 | Ozaki et al. | 725/112 |
| 6,557,103 B1 | 4/2003 | Boncelet, Jr. et al. | 713/176 |
| 6,587,127 B1 | 7/2003 | Leeke et al. | |
| 6,601,108 B1 | 7/2003 | Marmor | 709/246 |
| 6,611,845 B1 | 8/2003 | Dockter et al. | |
| 6,615,191 B1 | 9/2003 | Seeley | 705/54 |
| 6,618,484 B1 | 9/2003 | Van Wie et al. | |
| 6,659,861 B1 * | 12/2003 | Faris et al. | 463/1 |
| 6,661,904 B1 | 12/2003 | Sasich et al. | 382/100 |
| 6,664,969 B1 | 12/2003 | Emerson et al. | 345/544 |
| 6,668,246 B1 | 12/2003 | Yeung et al. | 705/57 |
| 6,675,201 B1 | 1/2004 | Parkkinen | 709/216 |
| 6,694,434 B1 | 2/2004 | McGee et al. | 713/189 |
| 6,766,454 B1 | 7/2004 | Riggins | 713/185 |
| 6,785,015 B1 * | 8/2004 | Smith et al. | 358/1.15 |
| 6,804,452 B1 | 10/2004 | Kuroda et al. | 386/94 |
| 6,877,005 B2 | 4/2005 | Hunter et al. | 707/10 |
| 6,903,681 B2 * | 6/2005 | Faris et al. | 342/357.06 |
| 6,931,532 B1 * | 8/2005 | Davis et al. | 713/167 |
| 6,976,248 B2 | 12/2005 | Balassanian | 717/148 |
| 7,190,878 B2 * | 3/2007 | Bolduc | 386/52 |
| 2001/0021926 A1 | 9/2001 | Schneck et al. | |
| 2001/0042045 A1 | 11/2001 | Howard et al. | |
| 2002/0013792 A1 | 1/2002 | Imielinski et al. | |
| 2002/0021807 A1 | 2/2002 | Saito | |
| 2002/0026475 A1 | 2/2002 | Marmor | 709/203 |
| 2002/0059344 A1 | 5/2002 | Britton et al. | 715/239 |
| 2002/0078343 A1 | 6/2002 | Rubin et al. | |
| 2002/0078361 A1 * | 6/2002 | Giroux et al. | 713/183 |
| 2002/0112250 A1 | 8/2002 | Koplar et al. | 725/153 |
| 2002/0156742 A1 | 10/2002 | Ogino et al. | 705/57 |
| 2002/0188570 A1 | 12/2002 | Holliman et al. | |
| 2002/0194485 A1 | 12/2002 | Ram et al. | |
| 2003/0133702 A1 | 7/2003 | Collart | |
| 2004/0054630 A1 | 3/2004 | Ginter et al. | |
| 2004/0225890 A1 | 11/2004 | Kang et al. | |

OTHER PUBLICATIONS

Darnell et al., "HTML 4 Second Edition Unleashed", 1999, Sams Publishing, pp. 1079.*
Yergeau, "UTF-8, a transformation format of Unicode and ISO 10646", RFC 2044, Oct. 1996, Network Working Group.*
"Chapter 3—Understanding Image Guardian," 3 pp., Sep. 11, 1998.
"Chapter 3—Understanding Web Referee," 3 pp., Sep. 11, 1998.
Stirland, Sarah, "ActiveX vs. Java," *Wall Street & Technology*, vol. 15, No. 8, p. 48, Aug. 1997.

Web Page Article, "Track Images Across the Web," Digimarc Corporation, All rights reserved, Copyright 1996-1999, 9 pp., http://www.digimarc.com/applications/copyright/copyright_bod.htm.

Wen-Nung Lie, Li-Chun Chang, "Data Hiding in Images With Adaptive Numbers of Least Significant Bits Based on the Human Visual Systems," *IEEE*, pp. 286-290, Oct. 1999.

"Overview of Cryptographic Services," Copyright X/Open Company Limited, 1996, 5 pp., http://opengroup.org/public/tech/security/gcs/overview.htm.

"Products—SiteShield—Copyright Issues," dated Sep. 11, 1998, 4 pp., Copyright 1997, Maximized Software, Inc. Press Release, "Maximized Software Launches Deterrent Against Internet Copyright Pirates," SiteShield: New Product PR, dated Sep. 11, 1998, 2 pp., Copyright 1996, Maximized Software, Inc.

"Copysight" [online], Copyright 1999 [retrieved on Jul. 5, 1999), http://www.ip2.com, 6 pp.

"Copysight: Now You Can Protect Your Website Content on the Internet With Copysight's Suite of Software and Business Solutions" [online], Copyright 1999 [retrieved on Jun. 3, 1999], http.://www.ip2.com, 8 pp.

"Digital Rights Management" [online], Copyright, 1996-1998 [retrieved on Jun. 3, 1999], Retrieved from the Internet: http://www.intertrust.com/drm/drm.ht . . . , 8 pp.

"SafeImage" [online], Copyright 1999 [retrieved on Jul. 5, 1999], Retrieved from the Internet: http://www.safemedia.com, 2 pp.

"SiteShield" press release [online], Copyright 1996 [retrieved on Sep. 11, 1998], Retrieved from the Internet: http://www.maximized.com/press/960529-1.html,, 2 pp.

"Softlock.Com" [online], Copyright 1992-1999 [retrieved on Jun. 3, 1999], Retrieved from the Internet: http://www.softlock.com, 13 pp.

Strom, D., "Browser: Protect Your Image on the Web" [online], [retrieved on Sep. 11, 1998], Retrieved from the Internet: http://www.zdnet.com. 4 pp.

Sellers, Duncan, "An Introduction to Steganography" [online], [retrieved on Apr. 2, 2009], Retrieved from the Internet: http://www.webarchive.org/web/20030309192623/http://www.totse.com/en/privacy/encryption/163947.html, 12 pp.

Mynatt, et al., "Nonvisual Presentation of Graphical User Interfaces: Contrasting Two Approaches," *ACM*, pp. 166-172, 1994.

"Secure Hash Standard," *Federal Information Processing Standards, Publication 180-1*, [online], Apr. 17, 1995 [retrieved on Apr. 2, 2009], Retrieved from the Internet: //www.itl.nist/gov/fipspubs/fip180-1.htm, 17 pp.

Web Page Articlee, "Welcome to SafeMedia" [online], Copyright 1999, [retrieved on Jun. 3, 1999], Retrieved from the Internet: http://www.safemedia.com, 2 pp.

\* cited by examiner

METHOD AND SYSTEM FOR COPY PROTECTION OF DISPLAYED DATA CONTENT

CROSS REFERENCES TO RELATED APPLICATIONS

This application is a continuation of and incorporates by reference assignee's application U.S. Ser. No. 09/996,623, now U.S. Pat. No. 6,993,662, filed on Nov. 28, 2001 and entitled "Method and System for Copy Protection of Displayed Data Content." This application is a continuation-in-part of assignee's pending application U.S. Ser. No. 09/774,236, filed on Jan. 29, 2001 and entitled "Method and System for Copy Protection of Data Content," which is a continuation-in-part of assignee's application U.S. Ser. No. 09/397,331, now U.S. Pat. No. 6,298,446, filed on Sep. 14, 1999 and entitled "Method and System for Copyright Protection of Digital Images Transmitted over Networks."

FIELD OF THE INVENTION

The present invention relates to copy protection of data content that is displayed by a computer on a display device, including inter alia content displayed by a web browser.

BACKGROUND OF THE INVENTION

Information in the form of text and imagery is commonly transmitted among computers within files such as Microsoft Word documents, Microsoft Excel spreadsheets, Microsoft PowerPoint slides, HTML web pages, XML documents and many other types of files that include text and imagery. Typically, a user viewing such files on a display device can freely copy portions of displayed text and imagery by several well-known means. For example, a user can select a portion of text with an input device such as a mouse or keyboard, copy the selected portion of text and paste it into another document, such as the body of an e-mail. For another example, a user can capture the contents of a screen into a clipboard by performing a screen capture, and then insert the contents from the clipboard into another document.

Text within web pages is particularly susceptible to copying. Web browsers displaying HTML pages typically enable a user to view source files for HTML pages being displayed. For example, in the Microsoft Windows operating system running Microsoft Internet Explorer or Netscape Communicator web browsers, a user merely clicks on a right mouse button when the mouse is positioned over an HTML page, and selects "View Source." The source file for the HTML page is then typically displayed in its entirety within a new window. A user can then readily select any portion of text from the source file, copy it and paste it into another document.

Some applications, such as Adobe's PDF Acrobat, can create non-editable files that can only be viewed within an application that disables the ability to copy selections of text, such as Adobe's PDF Reader. However, a user can capture any portion of a PDF file displayed on a screen by performing a simple screen capture.

Many information services earn their revenues by providing valuable information to clients. Examples of such services include financial services, marketing services, news services and legal services. Moreover, such information is often provided electronically. Using today's technology, a subscriber who receives such electronic information can easily copy it and e-mail it to others, thereby obviating the need for others to subscribe to the service and pay additional subscription fees.

There is thus a pressing need to find a way to prevent text and imagery that is displayed on a computer from being copied without authorization.

U.S. Pat. No. 5,905,505 of Lesk describes an image-based method and system for protecting text displayed on a screen. Lesk operates on a bit-mapped image of the text. Lesk creates two perturbed images, by adding random bits to the bit-mapped image of the text, and rapidly interlaces the two perturbed images. In this way, a user sees the desired image of the text by averaging both perturbed images, but at any given moment only one of the two perturbed images is displayed on the screen. Thus someone copying data from the screen only captures a perturbed image, which is difficult to decipher.

Lesk is difficult to implement in practice, since (1) the random bits have to be generated in such a way that the average of the two perturbed images appears "clean" and legible, whereas each of the individual perturbed images appears "dirty,", (2) Lesk has to be practiced at the level of a video display buffer, (3) for Internet applications, Lesk has to be practiced for each portion of an HTML page being viewed, and (4) it may not be comfortable for a user to view a monitor that is constantly flickering alternating displays. Moreover, it is possible to overcome Lesk by capturing two screens containing both perturbed images, and then averaging them together digitally.

There is thus a need to find a simpler and more practical way to prevent text and imagery displayed on a computer screen from being copied without authorization.

SUMMARY OF THE INVENTION

The present invention provides a method and system for copy protection of displayed content, including text and imagery within a document page, such as an HTML page, that is displayed by a computer on a display device. In a preferred embodiment, the present invention encrypts content designated as protected, and only decrypts the content when a page containing the content is being rendered into a graphics device for display. This serves to protect the designated content while it is off-screen. Specifically, when the present invention is employed to protect text content, an application viewing a source listing of the document page, or capturing the document page, is only able to capture encrypted text, which typically appears as gibberish.

To supplement the off-screen protection, the present invention preferably incorporates the invention described in assignee's application U.S. Ser. No. 09/397,331, now U.S. Pat. No. 6,298,446, filed on Sep. 14, 1999, entitled "Method and System for Copyright Protection of Digital Images Transmitted over Networks." The invention described in U.S. Ser. No. 09/397,331 protects data while it is on-screen. Thus, the present invention, when combined with the invention described in U.S. Ser. No. 09/397,331 protects designated content both while it is on-screen and while it is off-screen.

In a preferred embodiment of the present invention, protected text and imagery in HTML pages or other documents is encrypted, and only decrypted when being rendered into a graphics device by system text rendering functions such as Microsoft Windows' TextOut( ) function or Macintosh's DrawText( ) function.

In a general context the present invention provides a methodology to protect content that is rendered and formatted using patchable system calls. The present invention applies not only to protection of text and imagery, but also to protection of audio data, video data and other data content.

The present invention is useful for protection of content within HTML pages and e-mail and, more generally, for protection of enterprise data.

Although a user viewing content is able to see protected content, at every other level of the system except for a display buffer within a video card, the content is encrypted. In distinction to the present invention, conventional encryption technologies, such as PGP, decrypt encrypted content to a temporary file, from which a user views protected content. The present invention, however, does not decrypt encrypted content at the application level—only at the display level.

There is thus provided in accordance with a preferred embodiment of the present invention a method for altering text displayed in a formatted page, including locating a buffer of memory locations containing contents of a formatted page, locating a text string between two markers within the buffer, replacing the text string with an alternate text string, and inserting special fill characters in unfilled memory locations between the markers.

There is further provided in accordance with a preferred embodiment of the present invention a system for altering text displayed in a formatted page, including a buffer of memory locations containing contents of a formatted page, a search processor locating a text string between two markers within the buffer, and a text processor replacing the text string with an alternate text string and inserting special fill characters in unfilled memory locations between the markers.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention provides a method and system for copy protection of displayed content, including text and imagery within a document page, such as an HTML page, that is displayed by a computer on a display device. In a preferred embodiment, the present invention encrypts content designated as protected, and only decrypts the content when a page containing the content is being rendered into a graphics device for display. This serves to protect the designated content while it is off-screen. Specifically, when the present invention is employed to protect text content, an application viewing a source listing of a document page, or capturing a document page, is only able to capture encrypted text, which typically appears as gibberish.

To supplement the off-screen protection, the present invention preferably incorporates the invention described in assignee's application U.S. Ser. No. 09/397,331, now U.S. Pat. No. 6,298,446, filed on Sep. 14, 1999, entitled "Method and System for Copyright Protection of Digital Images Transmitted over Networks," the contents of which are hereby incorporated by reference. The invention described in U.S. Ser. No. 09/397,331 protects data while it is on-screen. Thus, the present invention, when combined with the invention described in U.S. Ser. No. 09/397,331 protects designated content both while it is on-screen and while it is off-screen.

In general terms the present invention preferably operates by encrypting protected content at its source, such as on a server computer, and only decrypting the content when writing it into a display buffer for video display. Thus an application handling the content is in fact handling encrypted content, and any attempt to copy content from the application, such as by copying a file or by attaching content to an e-mail, can only expose encrypted content.

Protected content is exposed when being written into a display buffer for display and, while in the display buffer, it is protected using applicant's invention as described in U.S. Ser. No. 09/397,331.

Figure 1:
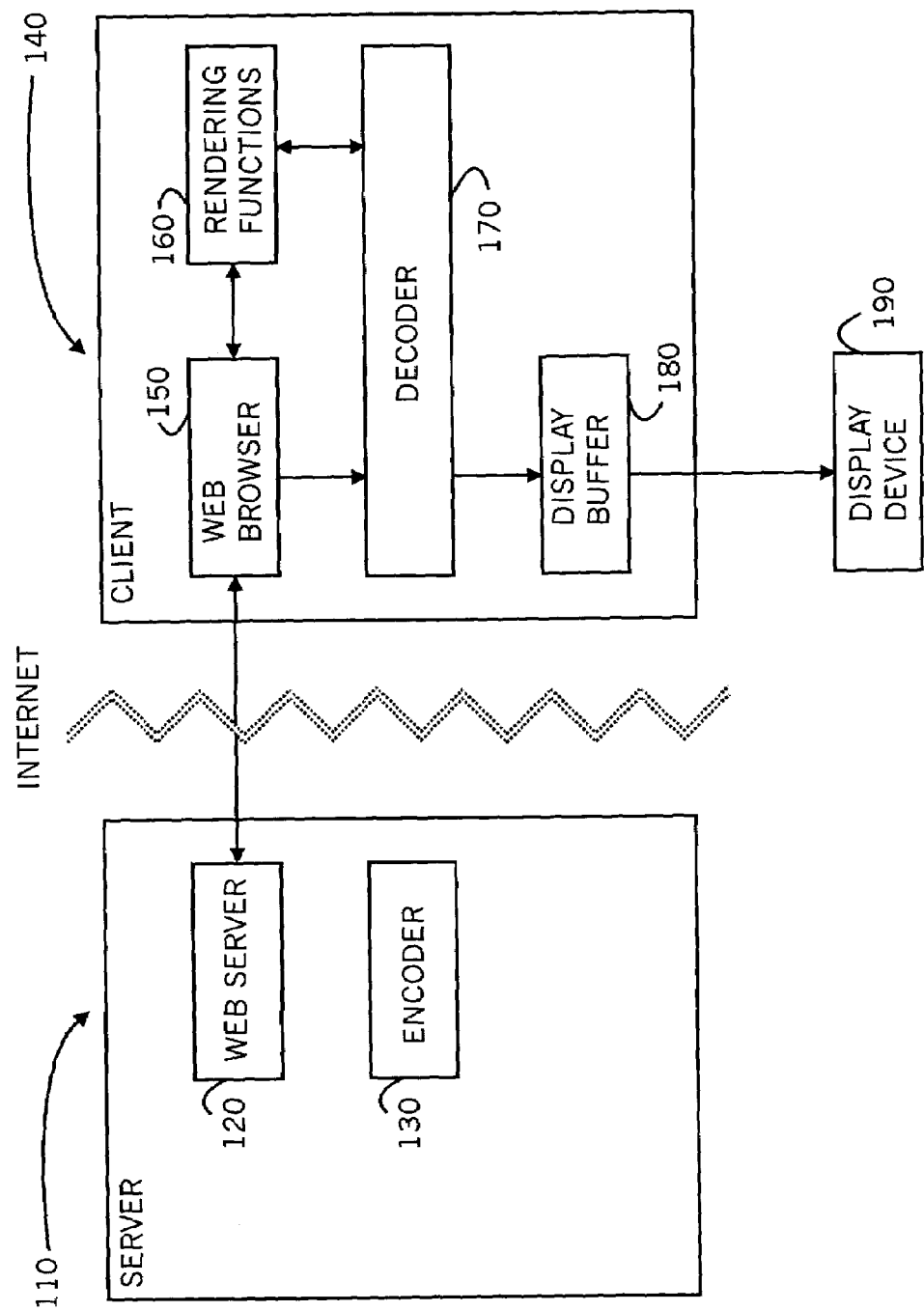
FIG. 1 is a simplified diagram of a content protection system operative in accordance with a preferred embodiment of the present invention.

Reference is now made to FIG. 1, which is a simplified diagram of a content protection system operative in accordance with a preferred embodiment of the present invention. Shown in FIG. 1 is a server computer 110, including a web server 120 for serving content to one or more clients, and an encoder 130 for encoding content designated by a system administrator or a content owner as protected.

Also shown in FIG. 1 is a client computer 140 connected to server computer 110 by a computer network, such as the Internet. Client computer 140 includes a web browser 150 for requesting and receiving content from web server 120, rendering functions 160, a decoder 170 for decoding content, and a display buffer 180 for storing raster bitmap data for display on a display device 190. Web browser 150 typically receives content within web pages, such as HTML pages, and uses rendering functions 160 to parse the web pages into display pages; i.e., raster bitmaps for display. HTML pages contain inter alia text and images, which have to be laid out appropriately within a display page.

As shown in FIG. 1, decoder 170 is operative to decode content as it makes its way from web browser 150 to display buffer 180. Specifically, decoder 170 intercepts encrypted content as it is being written to display buffer 180, and decodes it for display. In addition, decoder 170 is used in conjunction with rendering functions 160, to ensure that rendering functions 160 process decoded content rather than encrypted content, as will be described in more detail hereinbelow.

Figure 2:
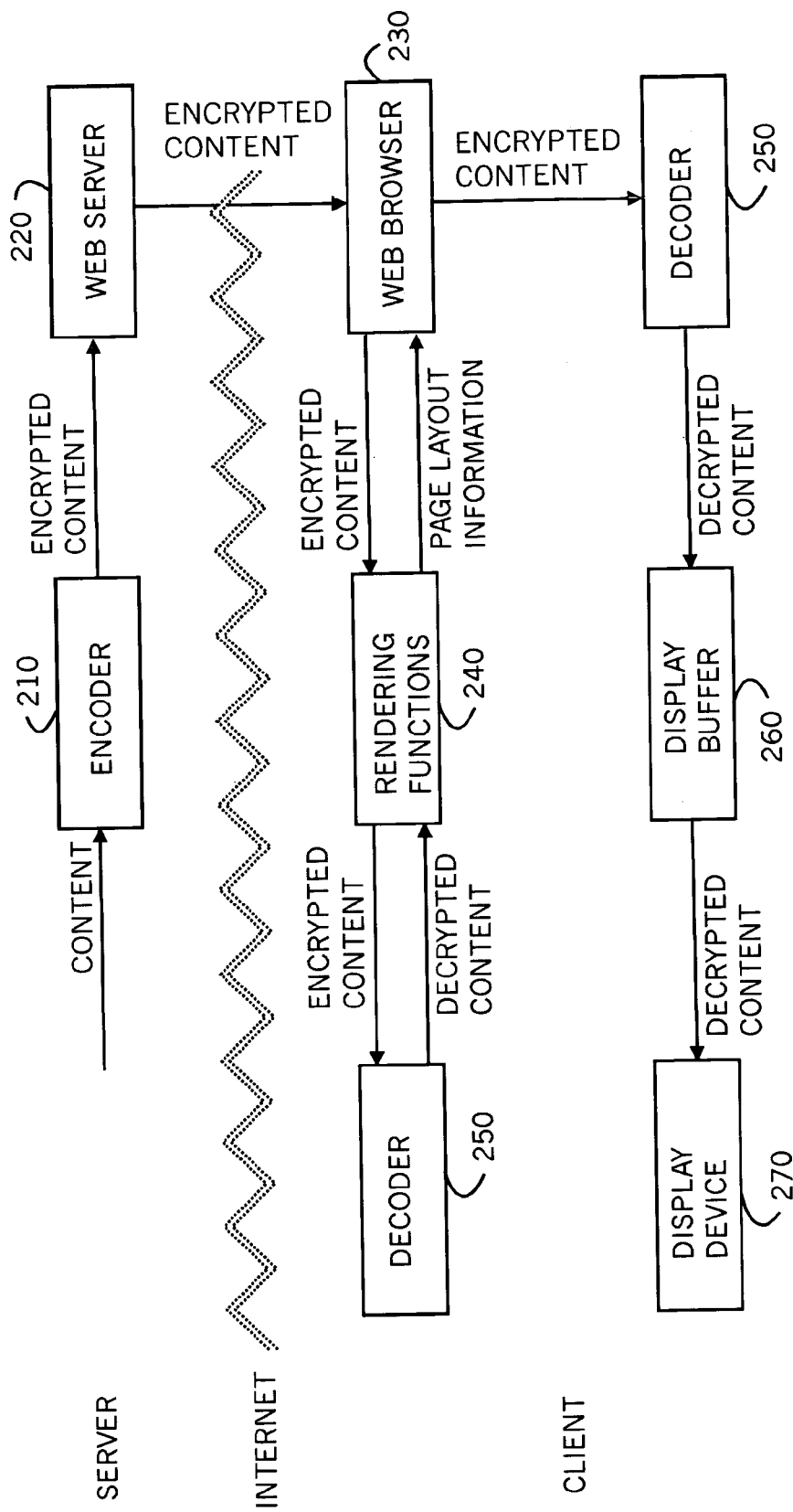
FIG. 2 is a simplified workflow diagram for protecting content in accordance with a preferred embodiment of the present invention.

Reference is now made to FIG. 2, which is a simplified workflow diagram for protecting content in accordance with a preferred embodiment of the present invention. Protected content is initially encoded within an encoder 210, preferably residing on a server computer, such as server computer 110 (FIG. 1). The encrypted content is served up within a web page over a network by a web server 220, upon request by a web browser 230, to a client computer, such as client computer 140 (FIG. 1).

The encrypted content is then passed to rendering functions 240, in order to determine a layout for displaying the web page. However, in order for rendering functions 240 to determine a layout appropriate for decrypted content, the content is preferably passed in and out of decoder 250 prior to being processed by rendering functions 240. Rendering functions 240 return to web browser 230 layout information for a display page containing decrypted content, although web browser 230 continues to hold encrypted content. The layout information returned by rendering functions 240 may be different than the layout information within the web page served by web server 220, as explained in detail hereinbelow.

Web browser 230 uses the layout information to prepare a display page for display buffer 260. However, on the way to display buffer 260, decoder 250 preferably intercepts the display page data and decodes the content included therein, so that in fact display buffer 260 contains a display page with decrypted content. Finally, display buffer 260 writes its data to a display device 270, which displays decrypted content.

To describe the role of rendering functions 240 in more detail, consider a case in which the protected content is text. The layout of text within a page depends on the size of a view window containing the page, the placement of other objects within the page, and fonts of characters within the text, and other parameters. The same text string, for example, generally has different layouts within view windows of different sizes, as illustrated hereinbelow in FIGS. 5A-5C.

Rendering functions 240 are preferably used to determine inter alia the breakup of text into lines and the placement of words within a display page. For protected text, web browser 230 passes encrypted text to rendering functions 240. Typically, encrypted text would have a different layout within a display page than decrypted text. As such, were rendering functions 240 to process the encrypted text, they would return incompatible layout information to web browser 230. In turn, this would result in a display page with incorrect text layout for the decrypted text. In order to avoid this problem, decoder 250 decrypts the text on its way from web browser 230 to rendering functions 240.

Figure 3:
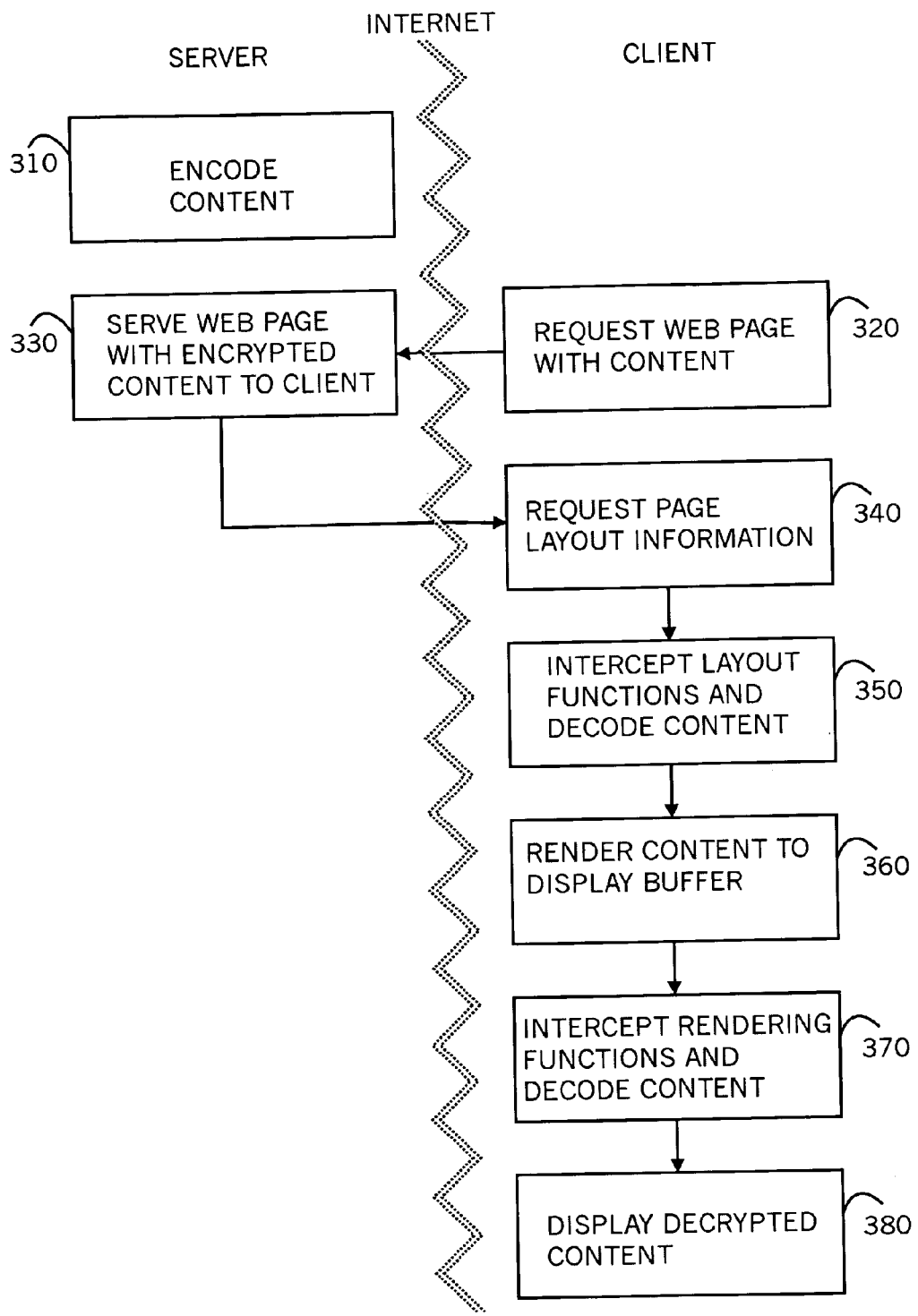
FIG. 3 is a simplified flowchart of a content protection method in accordance with a preferred embodiment of the present invention.

Reference is now made to FIG. 3, which is a simplified flowchart of a content protection method in accordance with a preferred embodiment of the present invention. At step 310 a server computer, such as server computer 110 (FIG. 1), encodes content that has been designated as protected. At step 320 a web browser within a client computer, such as client computer 140 (FIG. 1), requests the server computer to deliver protected content. At step 330 the server computer delivers to the client computer the encrypted content, typically within a web page such as an HTML page.

At step 340 the web browser, in order to display the web page with the included content, invokes rendering functions to determine a page layout for display. At step 350 the client computer intercepts the web page data on its way from the web browser to the rendering functions, and decodes the encrypted content. At step 360 the web browser renders the web page into a display page for writing to a display buffer. At step 370 the client computer intercepts the web page data before it is rendered into a display page, and decodes the encrypted content. Finally, at step 380 the client computer displays the display page written in the display buffer, which now contains decrypted content.

It is apparent to those skilled in the art that many variations of the method and system described in FIGS. 1-3 are possible and fall within the scope of the present invention. For example, web browser 140 may write to an off-screen buffer, rather than directly to display buffer 180. Such is the way Microsoft's Internet Explorer operates. Netscape's Communicator, on the other hand, writes directly to display buffer 180. The present invention has been illustrated as applying to web pages displayed by a web browser, but it applies equally well to document pages displayed by a document viewer, such as PDF documents viewed by Adobe Acrobat Reader, and Word documents viewed by a Microsoft Word processor.

Figure 4A:
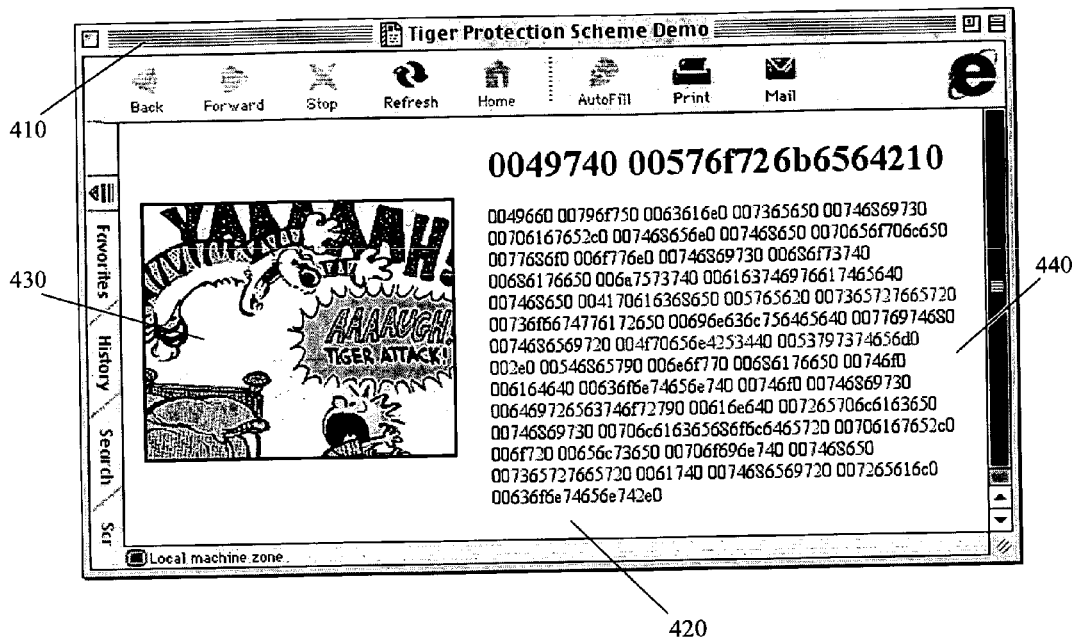
FIG. 4A is an illustration of an HTML page with protected text being displayed by a web browser without the intervention of a decoder.

Reference is now made to FIG. 4A, which is an illustration of an HTML page with protected text, being viewed by a web browser without the intervention of a decoder. Shown in FIG. 4A is a window 410 displaying an HTML page 420 containing an image 430 in the left side of the page, and text 440 in the right side of the page. The protected text is encrypted to text 440, and without the intervention of a decoder, appears only as gibberish on a display.

Figure 4B:
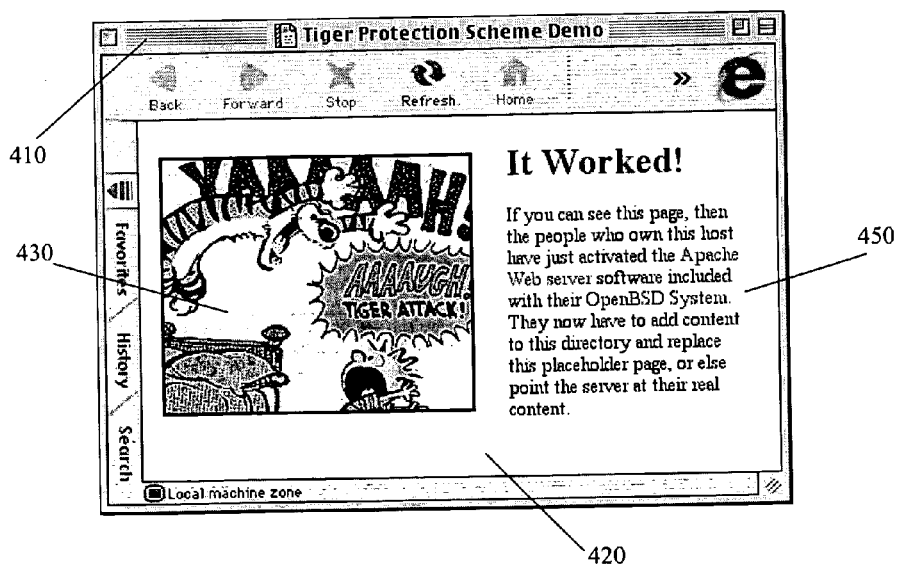
FIG. 4B is an illustration of an HTML page with protected text being viewed with the intervention of a decoder.

Reference is now made to FIG. 4B, which is an illustration of HTML page 420 being viewed with the intervention of a decoder. In accordance with a preferred embodiment of the present invention, prior to converting encrypted text 440 (FIG. 4A) to raster output, a decoder intercepts the encrypted text and decodes it to decrypted text 450. A viewer is thus able to display the original protected text, even though HTML page 420 contains only encrypted text.

Figures 4C, 4D:
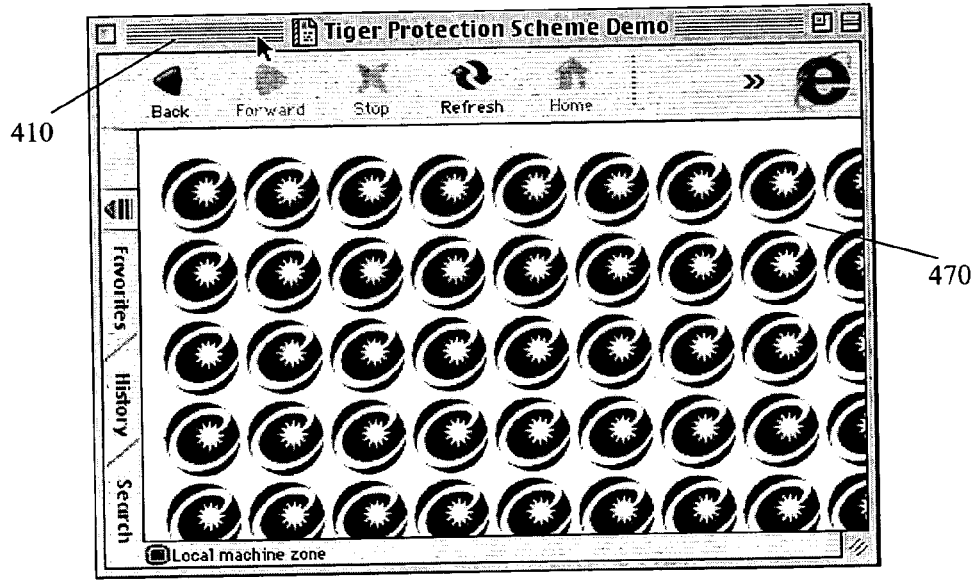
FIG. 4C is an illustration of a display of a source listing for the HTML page of FIG. 4A.
FIG. 4D is an illustration of a watermarked image resulting from an attempt to capture the page of FIG. 4A from a display screen.

Reference is now made to FIG. 4C, which is an illustration of a display of a source listing for HTML page 420 of FIG. 4B. Such a display can be obtained by a "View Page Source" command within a web browser. Since HTML page 420 contains encrypted text, when a user views the source for HTML page 420 it reveals only encrypted text 460—even though the display of the page shows decrypted text.

Reference is now made to FIG. 4D, which is an illustration of a watermarked image 470 resulting from an attempt to capture the page of FIG. 4B from a display screen. Using the invention described in the above referenced U.S. Ser. No. 09/397,331, when window 410 is captured, say, by invoking a screen capture command, the captured image is watermarked prior to being copied to a clipboard. When contents of the clipboard are subsequently pasted into an application, only watermarked image 470 appears. It can thus be appreciated that the present invention protects text from being copied while displayed on-screen, and also within an HTML page off-screen.

Figure 5A:
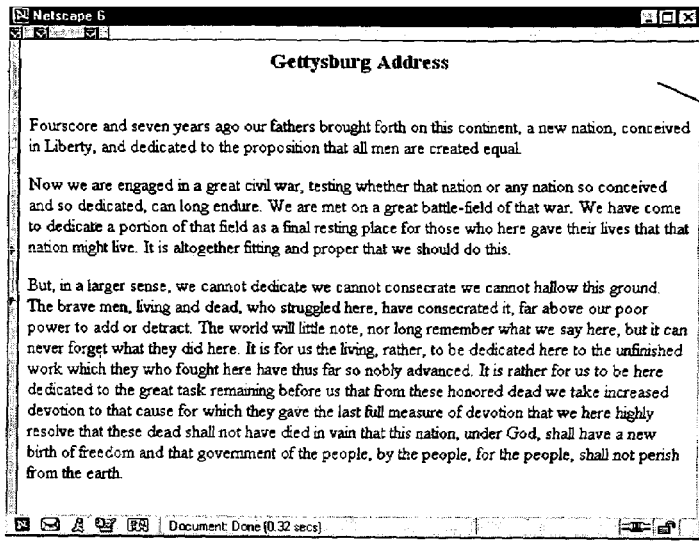
FIGS. 5A-5C are illustrations of a single HTML page with different text layouts when displayed in different sized view windows.
Figure 5B:
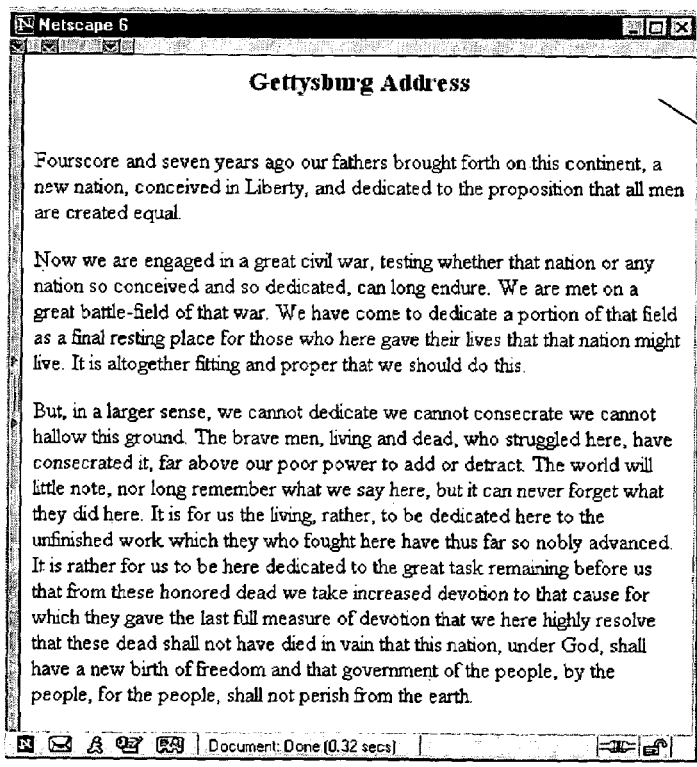
Figure 5C:
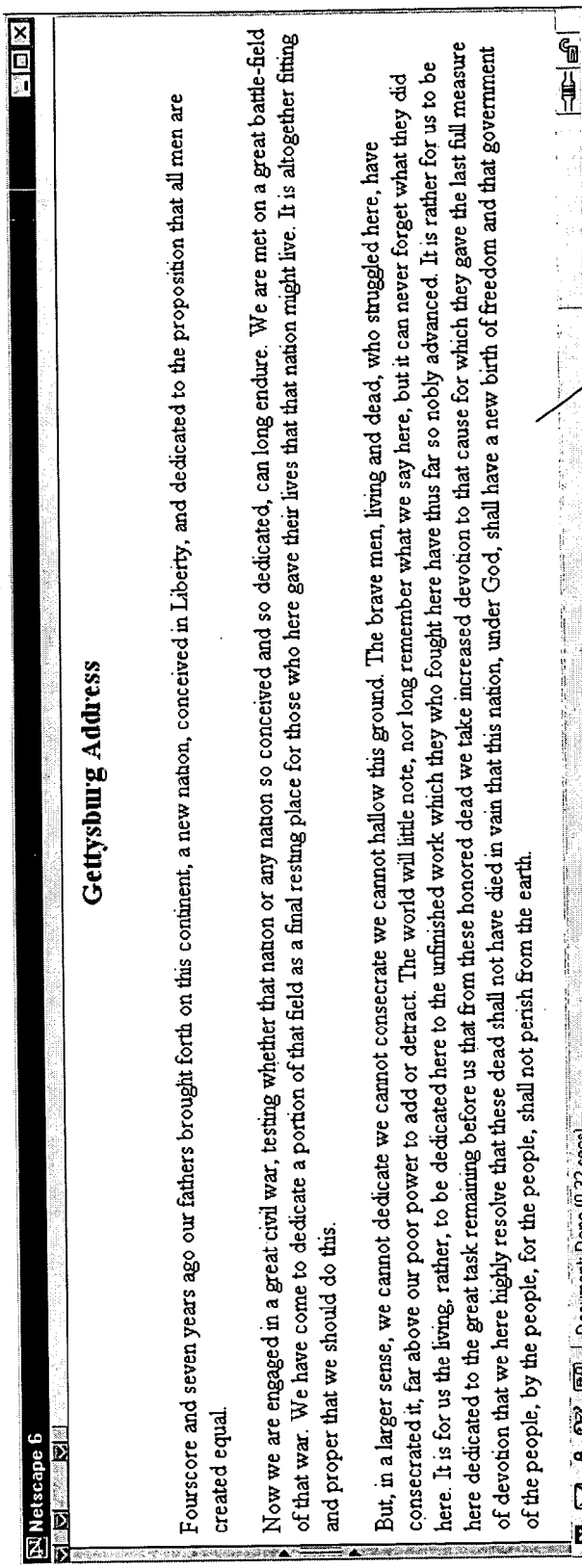

Reference is now made to FIGS. 5A-5C, which are illustrations of a single HTML page with different text layouts when displayed in different sized view windows 510, 520 and 530, respectively. Each of FIGS. 5A-5C corresponds to display of the same HTML page by Netscape's Communicator web browser. Specifically, they correspond to the following HTML page:

```
<HTML>
<BODY>
<H3 ALIGN=CENTER>Gettysburg Address</H3>
<P><BR>
Fourscore and seven years ago our fathers brought forth on this continent, a new nation, conceived in Liberty, and dedicated to the proposition that all men are created equal.</P>
<P> Now we are engaged in a great civil war, testing whether that nation or any nation so conceived and so dedicated, can long endure. We are met on a great battle-field of that war. We have come to dedicate a portion of that field as a final resting place for those who here gave their lives that that nation might live. It is altogether fitting and proper that we should do this.</P>
<P> But, in a larger sense, we cannot dedicate we cannot consecrate we cannot hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us that from these honored dead we take increased devotion to that cause for which they gave the last full measure of devotion that we here highly resolve that these dead shall not have died in vain that this nation, under God, shall have a new birth of freedom and that government of the people, by the people, for the people, shall not perish from the earth.</P>
</BODY>
</HTML>
```

Netscape Communicator determines how words of text are distributed into lines by means of a system function call GetTextExtent. As used in the present specification, the name "GetTextExtent" is a generic name used to denote one of several system functions to determine text layout, including inter alia the functions GetTextExtentPoint, GetTextExtent ExPoint and GetTextExtentPoint32. The function GetText Extent accepts a text string as input and determines its width, so that Communicator can decide how many words fit into a current line. For example, referring to FIG. 5A, GetTextExtent( ) is repeatedly called with text strings "Four," "Four score," "Four score and," "Four score and seven," etc., until it determines that the string "Four score and seven years ago our fathers brought forth on this continent, a new nation, conceived" fits in one line, but the string "Four score and seven years ago our fathers brought forth on this continent, a new" overflows the line. Thus the line in view window 510 breaks after the word "conceived." Similarly, in FIG. 5B view window 520 is narrower than view window 510, and using GetTextExtent( ) the browser determines that the string "Four score and seven years ago our fathers brought forth on this continent, a" fits in one line, but the string "Four score and seven years ago our fathers brought forth on this continent, a new" overflows the line. Thus the line in view window 520 breaks after the word "a."

If the text strings passed to GetTextExtent( ) had been encrypted text, then typically the wrong break up of words into lines would be determined; namely, a break up corresponding to encrypted text instead of decrypted text. In turn, the display page rendered by Netscape with decrypted text would have display errors. Typically, incorrectly decrypted text results in a white gap appearing on the right side of the browser window, since encrypted text is typically wider than decrypted text.

Figure 6:
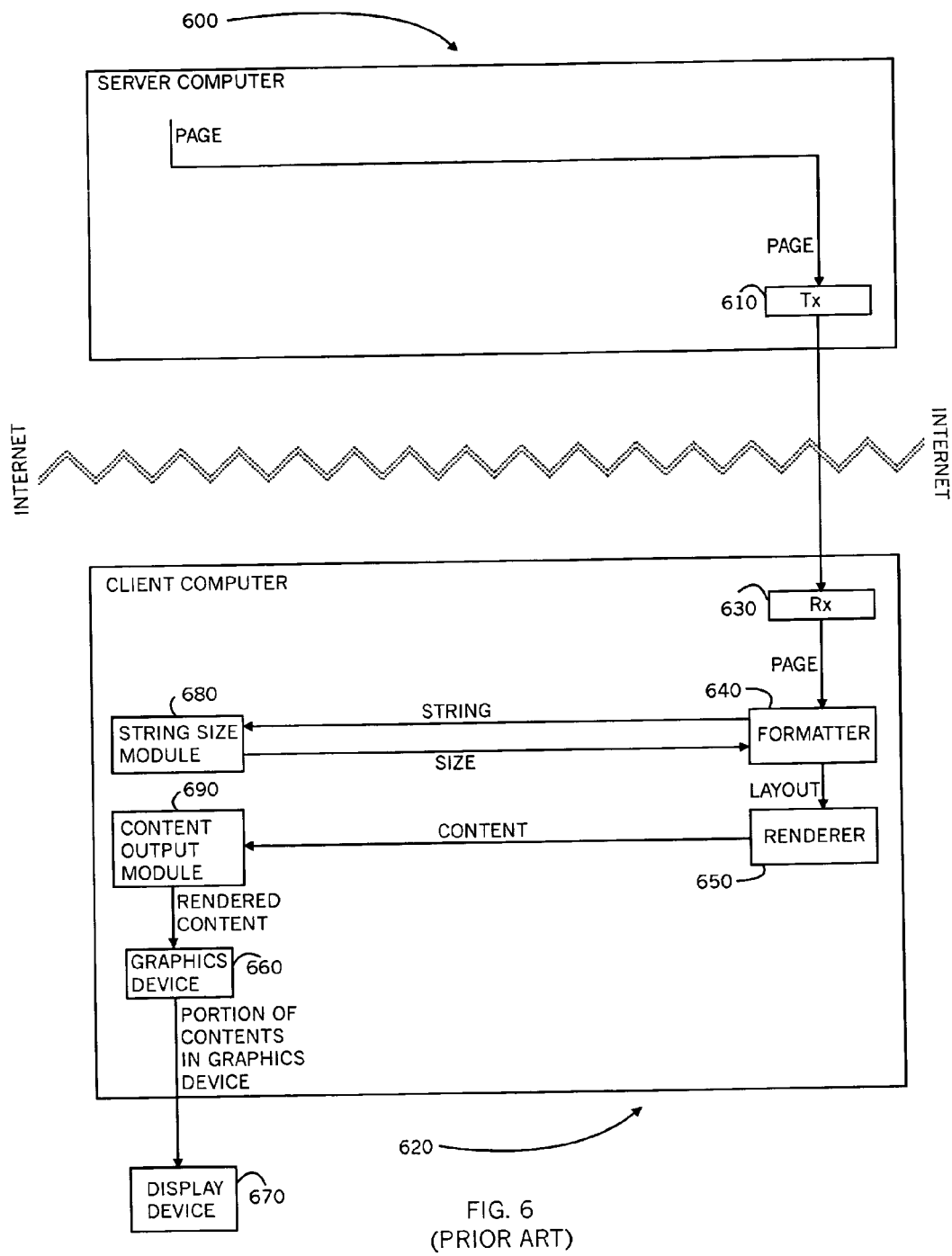
FIG. 6 is a simplified block diagram of a prior art system for delivering and rendering a page.

Reference is now made to FIG. 6, which is a simplified block diagram of a prior art system for delivering and rendering a page. A server computer 600 contains documents that include pages having original content therewithin. By way of example, pages may be Internet web pages such as HTML or XML pages, pages within a Microsoft Word document, pages within an Excel spreadsheet, or pages within a Microsoft PowerPoint presentation. A transmitter 610 transmits a page to a client computer 620 over the Internet.

Client computer 620 includes a receiver 630 that receives the page and transfers it to a formatter 640 for determining a page layout, as described hereinbelow. After formatter 640 determines a page layout, a renderer 650 renders the page into a graphics device 660. By way of example, renderer 650 may be a web browser, which renders HTML pages. Also, by way of example, graphics device 660 may be a memory device, a screen device or a graphics port. Within the Microsoft Windows operating system, Netscape Communicator renders HTML pages directly into a screen device, and Microsoft Internet Explorer renders HTML pages into a memory device. Within the Macintosh operating system, both Netscape Communicator and Microsoft Internet Explorer render HTML pages into a graphics port.

Finally, a portion of data in graphics device 660, or all of the data in graphics device 660, is displayed on a display device 670 connected to client computer 620.

The operation of formatter 640 will now be described. Formatter 640 determines a page layout for a given page. Typically, formatter 640 determines how many words to place within lines of the given page, based on the font type and font size currently selected. To determine widths of words, formatter 640 sends character strings to a string size module 680. String module 680 accepts a character string as input, and returns the width of the string, based on the font type and font size currently selected. Formatter 640 repeatedly sends individual words to string module 680, or strings with multiple words therein, in order to identify widths of text and thereby determine how many words to fit within lines of the page. Formatter 640 passes a page layout to renderer 650. String module 680 is typically an operating system function, such as the Microsoft Windows GetTextExtent( ) function.

The operation of renderer 650 will now be described. Renderer 650 sends content such as text to a content output module 690. Content output module accepts content as input and converts the content to rendered content, such as raster output, for writing to graphics device 660. Content output module 690 is typically one or more operating system functions, such as the Microsoft Windows TextOut( ) function and the Macintosh DrawText( ) function.

Figure 7:
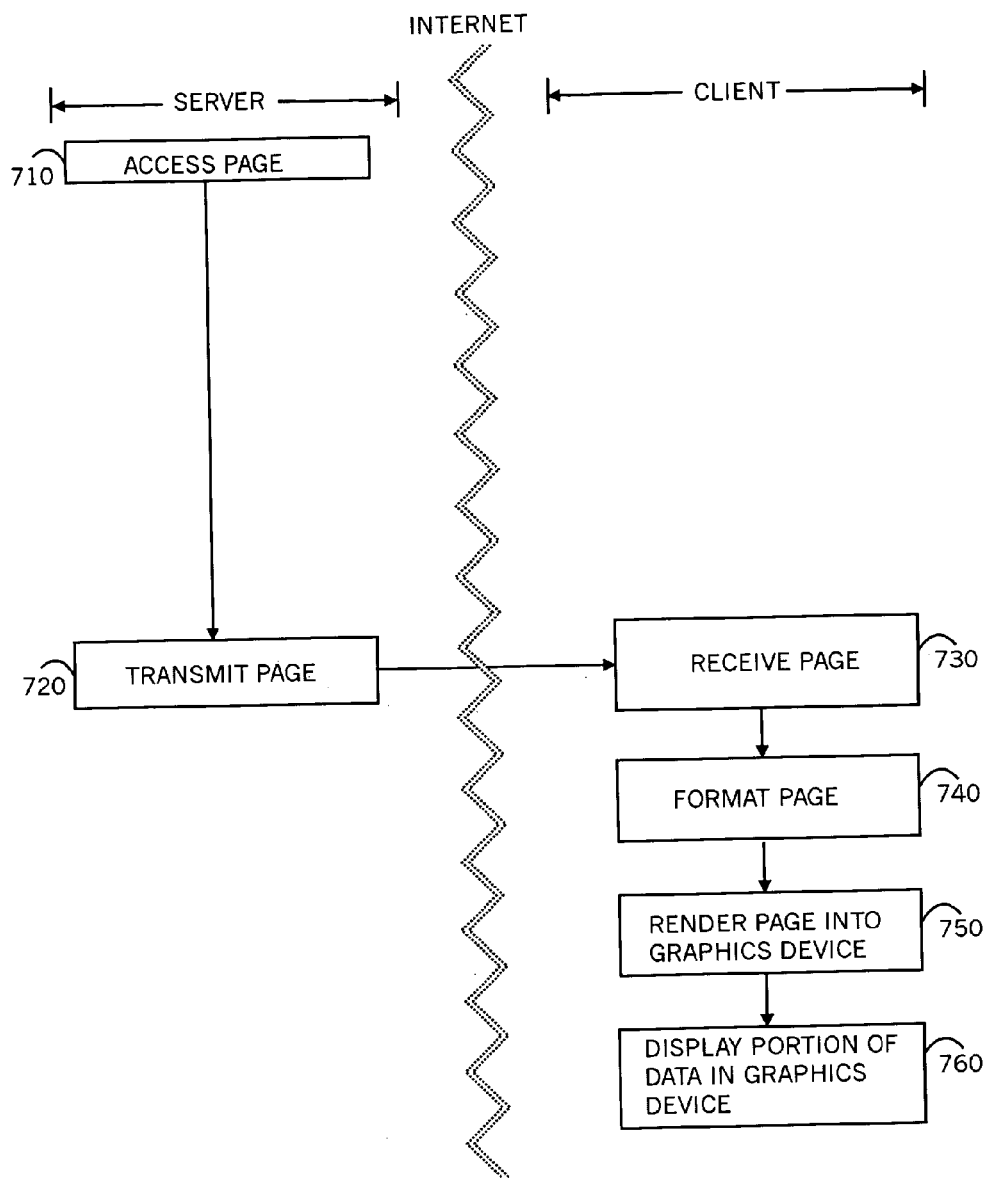
FIG. 7 is a simplified flow diagram of a prior art method for delivering and rendering a page.

Reference is now made to FIG. 7, which is a simplified flow diagram of a prior art method for delivering and rendering a page. At step 710 a server computer, such as server computer 600 (FIG. 6) accesses a web page. At step 720 the server computer transmits the page to a client computer, such as client computer 620 (FIG. 6), over the Internet.

At step 730 the client computer receives the page. At step 740 the client computer formats the page to determine a page layout. At step 750 the client computer renders the page into a graphics device, based on the page layout. At step 760 the client computer displays a portion or all of the contents in the buffer on a display device connected to the client computer.

Figure 8:
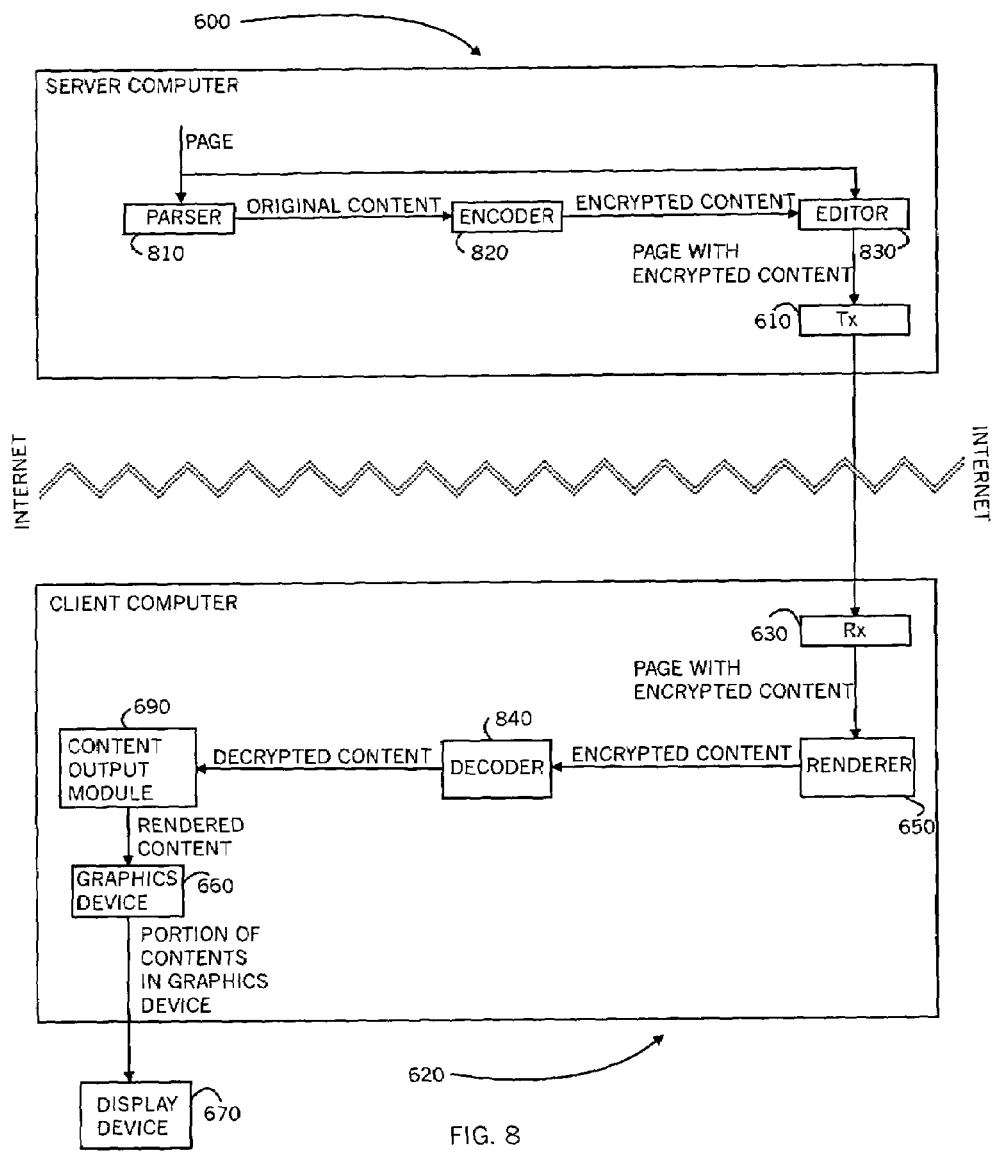
FIG. 8 is a simplified block diagram of a system for protection of content within a page according to a preferred embodiment of the present invention.

Reference is now made to FIG. 8, which is a simplified block diagram of a system for protection of content within a page according to a preferred embodiment of the present invention. Server computer 600 contains documents that include pages having original content therewithin. In a preferred embodiment of the present invention, portions of original content within a page, or all of the original content within a page, can be designated as protected.

A parser 810 parses a page and identifies original content that is designated as protected. Such identified original content is transferred to an encoder 820 that encrypts the original content into encrypted content. The encrypted content and the page are transferred to an editor 830 that replaces the identified original content with the encrypted content, within the page. Transmitter 610 then transmits the page with the encrypted content to client computer 620 over the Internet.

Receiver 630 within client computer 620 receives the page with the encrypted content and transfers it to renderer 650 for rendering the page into a graphics device 660. In a preferred embodiment of the present invention, renderer 650 identifies the encrypted content and transfers it to a decoder 840 that decodes the encrypted content prior to the content being passed to content output module 690. Content output module 690 converts the decrypted content to rendered content, which is written into graphics device 660. Finally, a portion of data in graphics device 660, or all of the data in graphics device 660, is displayed on display device 670 connected to client computer 620.

An important aspect of the present invention is that without the intervention of decoder 840, the page being rendered into graphics device 660 would contain encrypted content. Any other application that captures data from the page will only capture the encrypted content, which typically appears as gibberish. Thus the original content designated as protected is not exposed to other applications.

Figure 9:
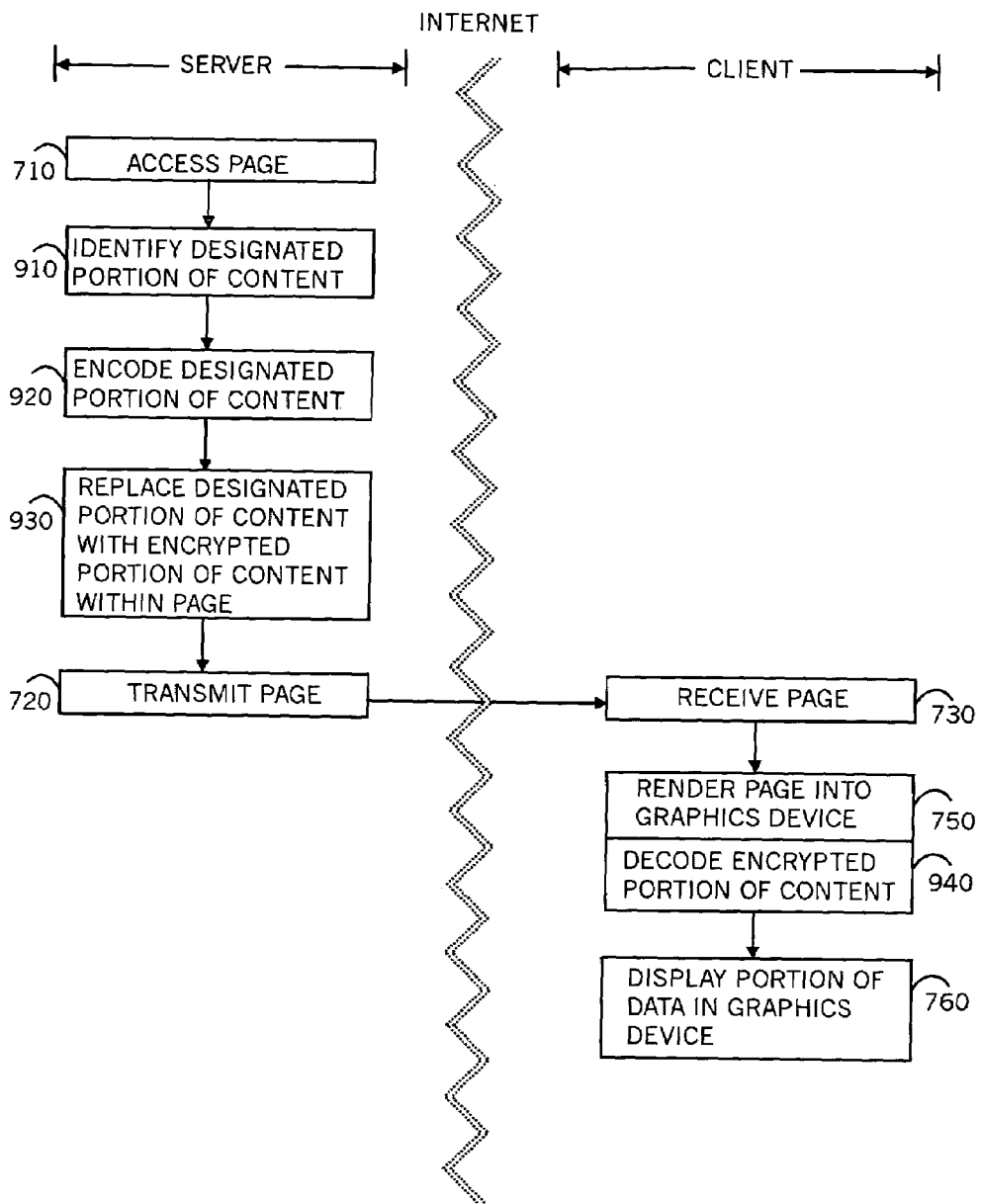
FIG. 9 is a simplified flow diagram of a method for protection of content within a page according to a preferred embodiment of the present invention.

Reference is now made to FIG. 9, which is a simplified flow diagram of a method for protection of content within a page according to a preferred embodiment of the present invention. At step 910 a server computer, such as server computer 600 (FIG. 8) accesses a web page. A portion of original content within the web page, or all of the original content within the page, is designated as protected. At step 910 the server computer identifies the portion of original content designated as protected. At step 920 the server computer encodes the designated portion of original content into encrypted content. At step 930 the server computer replaces the designated portion of original content with the encrypted content, within the page. At step 720 the server computer transmits the page with the encrypted content to a client computer, such as client computer 620 (FIG. 8), over the Internet.

At step 730 the client computer receives the page with the encrypted portion of content. At step 750 the client computer renders the page with the encrypted portion of content into a graphics device. While rendering the page, at step 940 the client computer decodes the encrypted portions of content prior to the content being rendered into the graphics device. At step 760 the client computer displays a portion or all of the contents in the graphics device on a display device connected to the client computer.

Although a user of the present invention viewing content sees decrypted content, at every other level of the system except for a display buffer within a video card, the content is encrypted. In distinction to the present invention, conventional encryption technologies, such as PGP, decrypt encrypted content to a temporary file, from which a user views protected content. The present invention, however, does not decrypt encrypted content at the application level—only at the display level.

Although the present invention is described in FIGS. 8 and 9 as embodied within a client server architecture, it is readily apparent to persons skilled in the art that it can alternately be embodied within a single computer. In this alternate embodiment, parser 810, encoder 820 and editor 830 reside within client computer 620. Similarly, steps 710, 910, 920 and 930 can be performed by the client computer. In this alternate embodiment, transmitter 610 and receiver 630 are unnecessary, and steps 720 and 730 are unnecessary. This alternate embodiment applies to situations wherein the pages containing designated text for protection already reside on client computer 620.

Additionally, the present invention can be embodied in separate computers, not necessarily within a client server environment, whereby one computer is used for creating a document with protected text, and another computer is used for viewing the document. The computer creating the document preferably includes parser 810, encoder 820 and editor 830, and the computer viewing the document preferably includes renderer 650, decoder 840 and graphics device 660. Similarly, steps 710, 910, 920 and 930 are preferably performed by the computer creating the document, and steps 750, 940 and 760 are preferably performed by the computer viewing the document.

Additionally, a page with encrypted content may already be stored within client computer 620, in which case the use of server computer 600 to encrypt and transmit the page is unnecessary.

The present invention may alternatively employ a filter, rather than server computer 600, in order to encrypt protected content. Such a filter can be embodied in the form of a COM object or a Java bean that can interface with enterprise applications such as Microsoft Exchange. Thus it may be appreciated that the present invention can be adapted to protect content within HTML and e-mail and, more generally, to protect enterprise data.

The formatting of text within a document page can be pre-determined based on formatting parameters and control characters pre-set by a user creating the document, or dynamically at the time of rendering based on dimensions of a display window. The former setup is typical for highly structured documents, such as Microsoft Word documents. When creating such documents, a user can pre-set font sizes, character, line and paragraph spacings, and left, right, top and bottom margins, and insert white space characters, indentation characters, and carriage return/line feed characters within text. In this scenario, the user creating the document has substantial control over the way text within the document is formatted.

The latter setup is typical for less structured documents, such as HTML web pages. As can be seen in a source listing for an HTML page, text within HTML is typically strung out as a long stream of characters, without carriage return/line feeds markings. A web browser typically dictates the format of text within an HTML page dynamically at the time of rendering, based on computer display settings, relative font sizes for different levels of headings and body text, and the layout of other objects within the HTML page such as images and hyper links. Thus, for example, the text within the HTML page illustrated in FIG. 4A is simply a single stream of characters, and its formatting in terms of lines is determined by a web browser.

Typically dynamic formatting is performed by measuring widths of words or elements on a page. From this information, a layout of the page can be determined. With text, for example, the layout is determined based on how many words can be fit within one line before starting a new line. Once a layout has been determined, text and other elements are rendered to a screen in correct locations.

Many applications use functions similar to the Windows Device Context API function BOOL GetTextExtentPoint32 (HDC hDC, LPCTSTR lpString,
   int cbString, LPSIZE lpSize);

A string of characters is passed to such a function. A device context already knows the font metrics, including font type and size, and these are used to calculate the width of the string, in measurement units appropriate to the device context.

For example, the following program instructions illustrate a typical device context setup.

DC=newDC
   DC-->SetFont(Ariel Bold)
   DC-->SetSize(12)
   DC-->TextOut("Hello")

The first line sets up a new device context. The second line sets the font type to Ariel Bold. The third line sets the font size to 12 pt. The fourth line outputs the text string "Hello." At this last stage of outputting text, the font type and font size for the device context have already been set.

Since the present invention operates by replacing protected original text with encrypted text, it is important to address the issue that characters and words of the encrypted text may not have the same sizes and widths as those of the original text. For applications with dynamic text layout, formatter 640 (FIG. 6) may derive an improper page layout, based on the encrypted text rather than on the original text. For example, formatter 640 may allocate too many lines for text or too few lines for text. When decoder 840 decrypts the encrypted text and renders it into graphics device 660, the decrypted text may not fill up the lines allocated therefore, in the case of too many lines, or may overlap other objects such as images, in the case of too few lines.

One approach to this issue is to ensure that the characters and words of the encrypted text have the same sizes and lengths as those of the original text, by using character-by-character encryption. However, character-by-character encryption has a drawback of being too simplistic an encoding—one that can easily be cracked. Moreover, the server may not know what fonts are available on the client.

In a preferred embodiment, the present invention operates by employing more complex encryption than character-by-character encryption, and "fooling" formatter 640 into believing that the encrypted text does indeed have the same character and word sizes as the original text, when in fact it does not.

As mentioned hereinabove, formatter 640 typically determines a page layout based on widths of words in text, and it typically identifies such widths by invoking functions such as Microsoft Windows' GetTextExtent( ). In a preferred embodiment, the present invention patches such functions so as to return lengths of words in the decrypted text, instead of lengths of words in the encrypted text within the page. Specifically, the patched portion of GetTextExtent( ) decrypts the input string and passes the decrypted string to the conventional GetTextExtent( ) function. Formatter 640 then determines a layout based upon the decrypted text, rather than upon the encrypted text.

Typically formatters do not simply call GetTextExtent( ) with individual words in order to determine how many words fill up a line. Rather, they call GetTextExtent( ) with larger units, such as a complete sentence or even a complete paragraph. Based on the size returned by GetTextExtent( ), the formatter then iteratively sends a shorter string or longer string, depending on whether the previous string size was in excess or in deficiency of a full line, respectively. In any event, the present invention, by decrypting whatever string is input to GetTextExtent( ) ensures that the size returned by GetText Extent( ) corresponds to decrypted text rather than to encrypted text.

Typically, the steps involved in rendering a page having text and possibly other objects are:
1. Receive data.
2. Divide the data into individual granular elements, such as words.
3. Measure the size of each element.
4. Determine a layout, based on the sizes of the elements.
5. Render the page to a display device, based on the layout.

In a preferred embodiment, the present invention intervenes at steps 3 and 5, by decrypting encrypted data and replacing the encrypted data with the corresponding decrypted data.

Thus it may be appreciated that the present invention can employ complex encryption algorithms, based on words rather than individual characters, without suffering from improper text layouts. The present invention can employ encryption algorithms that encrypt each word, and that add leading and trailing characters to flag text as being encrypted. The present invention can also pad encrypted text so that identical words have distinct encrypted representations, thereby preventing users from thwarting the present invention by building up dictionaries of encrypted and matching decrypted words.

Figure 10:
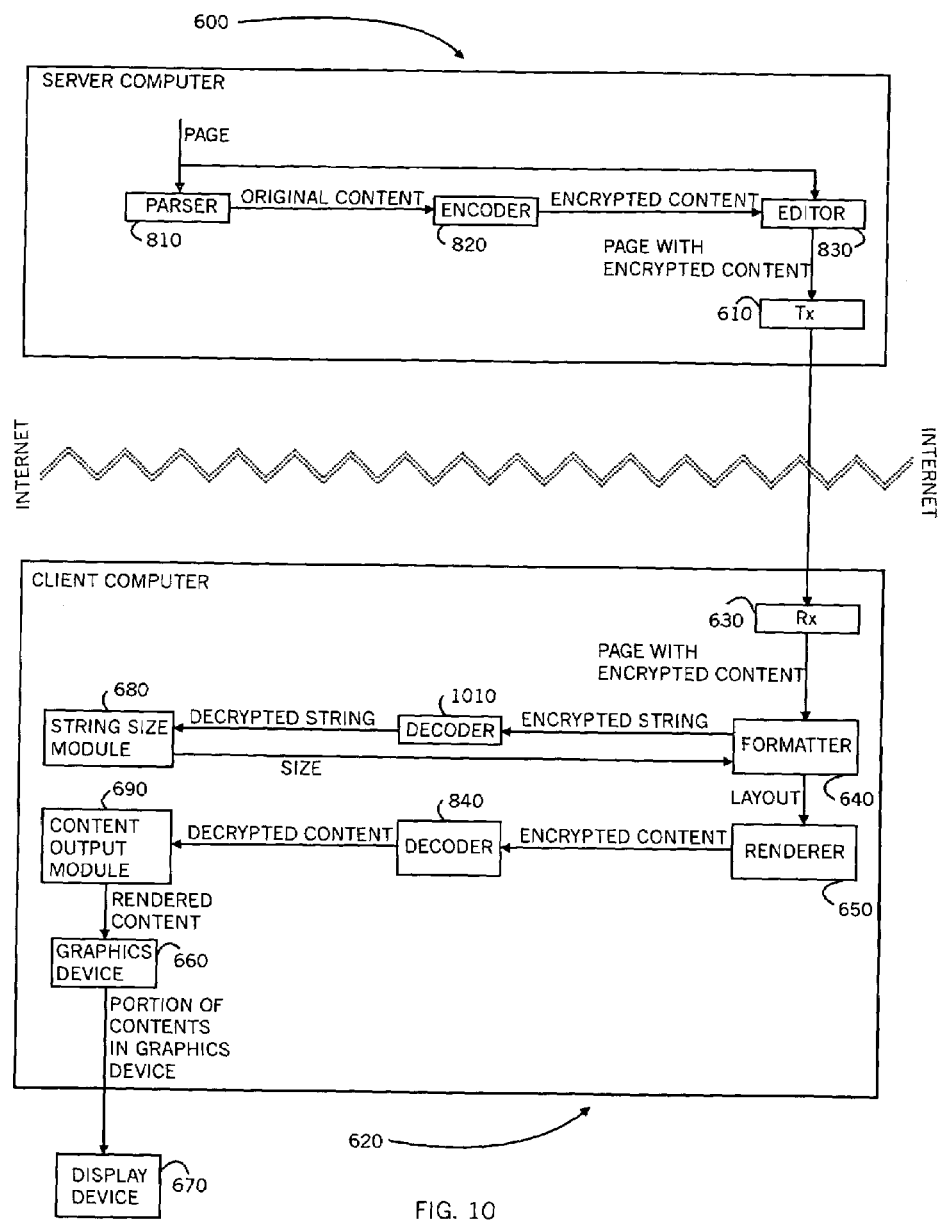
FIG. 10 is a simplified block diagram of a system for protection of content within a page including a formatting module, according to a preferred embodiment of the present invention.

Reference is now made to FIG. 10, which is a simplified block diagram of a system for protection of content within a page including a formatting module, according to a preferred embodiment of the present invention. FIG. 10 includes the elements of FIG. 8, and additionally includes formatter 640, decoder 1010 and string size module 680. Formatter 640 calls string module 680 to identify widths of various character strings, relative to the font types and font sizes of a device context, in order to determine a page layout. Specifically, formatter 640 uses character string width information to determine how many words to fit in lines of the page. Decoder 1010 intercepts the character strings on their way to string size module 680, and replaces them with decrypted strings prior to string size module 680 determining the string widths. The intervention of decoder 1010 ensures that the string widths provided to formatter 640 for determining a page layout correspond to string widths for decrypted strings, rather than for encrypted strings which typically have different word widths.

Figure 11:
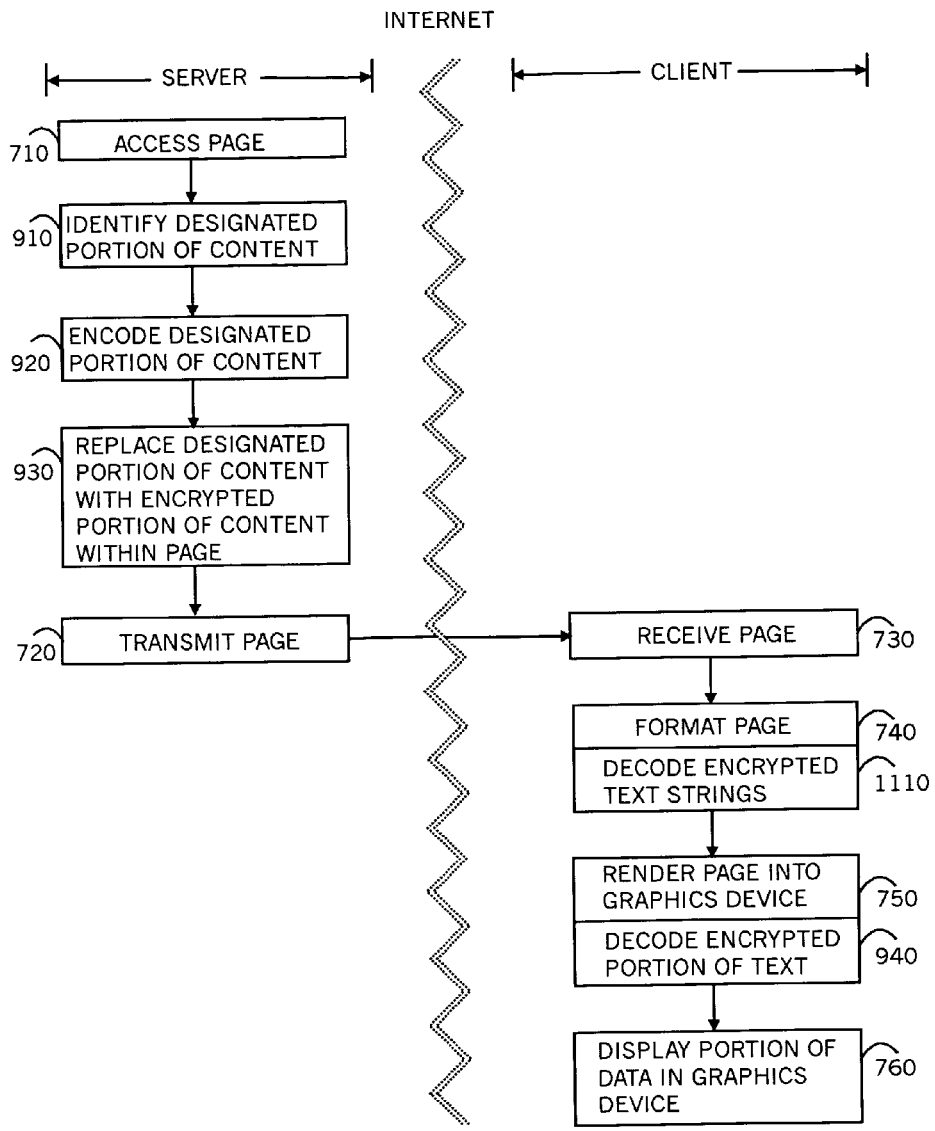
FIG. 11 is a simplified flow diagram of a method for protection of content within a page including a formatting step, according to a preferred embodiment of the present invention.

Reference is now made to FIG. 11, which is a simplified flow diagram of a method for protection of content within a page including a formatting step, according to a preferred embodiment of the present invention. FIG. 11 includes the steps of FIG. 9, and additionally includes step 740 formatting the page, and step 1110 decoding encrypted text strings.

Implementation Details

Unlike Netscape's Communicator web browser, Microsoft's Internet Explorer web browser does not use a GetTextExtent function to determine layout of text within a display page. Instead, Microsoft's HTML library, mshtml.dll, calls a library named msls31.dll for text processing. Specifically, it calls a function named LsCreateLine( ) within msls31.dll to determine breakup of text into lines.

The function LsCreateLine( ) uses a memory buffer to store contents from an HTML page. The contents are stored between markers for HTML tags. Specifically, Internet Explorer uses a special 16-bit Unicode marker as a placeholder for an HTML tag. Internet Explorer 5, for example, uses U+FFFE Unicode markers to delineate HTML text within tags, and Internet Explorer 6 uses U+FDEF Unicode markers. For the sake of clarity, the special marker is referred to as U+FFFE hereinbelow, but it will be appreciated by those skilled in the art that the actual Unicode marker character used by a browser may differ from browser version to browser version.

The text portion of an HTML page is written to the buffer in 16-bit Unicode characters, between appropriate markers. The positions of the markers are stored in a look-up table.

Figure 12:
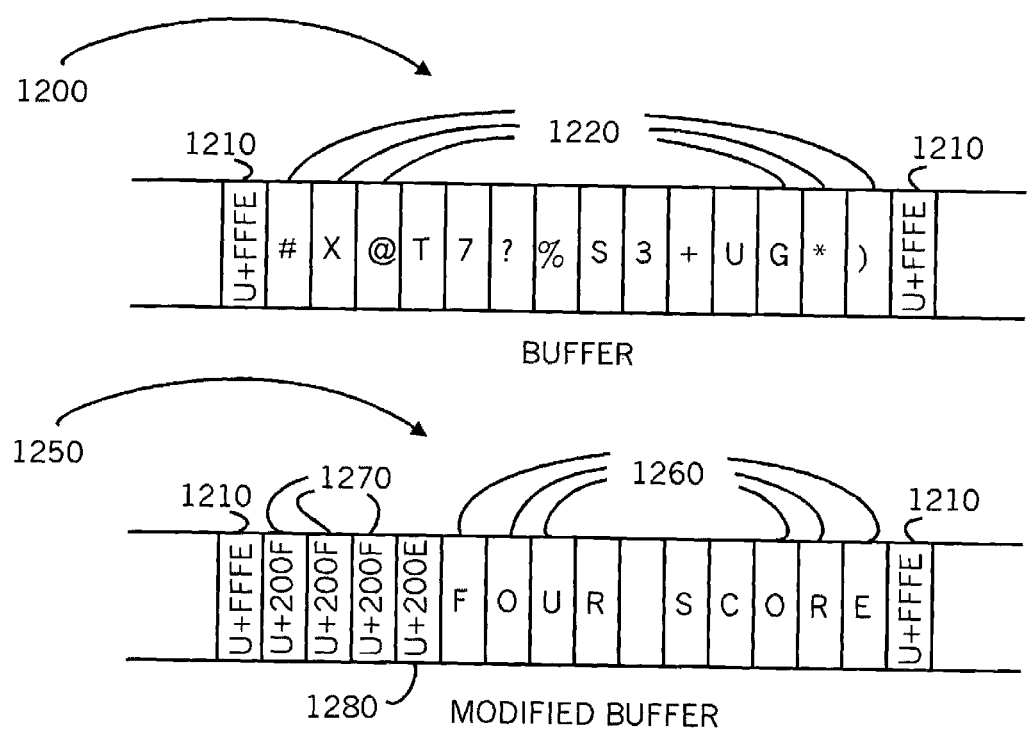
FIG. 12 is a simplified illustration of a modified buffer with decrypted text, used in a preferred embodiment of the present invention.

Reference is now made to FIG. 12, which is a simplified illustration of a modified buffer with decrypted text, used in a preferred embodiment of the present invention. Buffer 1200 corresponds to a buffer used by LsCreateLine( ). It contains text from an HTML page between U+FFFE markers 1210. The text consists of a string of Unicode characters 1220. Hex numbers, such as markers 1210, are shown in FIG. 12 in a vertical position, and Unicode characters, such as characters 1220, are shown in a horizontal position.

For protected text, the HTML page contains encrypted text rather than original text. Thus Unicode characters 1220 come from an encrypted text string "#X@T7?% S#+UG*)". In accordance with a preferred embodiment of the present invention, buffer 1200 is modified by replacing encrypted text with decrypted text. Modified buffer 1250 includes the same U+FFFE markers 1210, but it holds Unicode characters 1260 from a decrypted text string "Four score", rather than from the encrypted text string.

It is noted that the decrypted string has fewer characters than the encrypted string. Preferably this is the case in general. As such, Unicode characters 1260 from the decrypted string occupy fewer memory locations than Unicode characters 1210 from the encrypted string. If the extra space were to be collapsed by closing in the U+FFFE markers in buffer 1250, then the look-up table storing the marker addresses would no longer be consistent with the buffer contents. In turn, this would generally result in incorrect formatting when the Internet Explorer browser tries to display the HTML page.

In a preferred embodiment of the present invention, the unfilled memory locations in buffer 1250 are filled with an invisible Unicode character U+200F. This special character is ignored by the browser, similar to the way zeros are ignored in front of integers. Moreover, the U+200F Unicode character is only ignored when it is in front of other Unicode characters, rather than behind them, analogous to the way zeros are ignored in front of integers but not at the end of integers. As such, the present invention preferably pads U+200F Unicode characters 1270 in front of the decrypted characters 1260, so as to fill the buffer between markers 1210.

More precisely, as shown in FIG. 12, in filling N memory locations, preferably the first N−1 locations are filled with the Unicode character U+200F, and the N$^{th}$ location is filled with the Unicode character U+200E. The use of a U+200E Unicode character 1280 for the last unfilled location is preferably done in order to avoid reversals of brackets.

Buffer 1250, containing the decrypted text, is then processed by LsCreateLine as if the HTML page itself had contained the decrypted string.

In a preferred embodiment of the present invention, decoding step 940 (FIG. 9) is performed within a patched operating system function that is used by renderer 650 (FIG. 6) to convert text to raster data within graphics device 660. Specifically, when rendering a page into a graphics device for display, text is converted into a bitmap image. In the Microsoft Windows operating system, for example, a function TextOut( ) is invoked to convert text to bitmap; and in the Macintosh operating system a similar function DrawText( ) is used.

The term "patching" as used throughout the present invention includes several techniques for intervening with a function call. These include:
1. Inserting additional instructions into the function itself.
2. Re-directing a call to the function with a call to a different function.
3. Changing an address of the function within a look-up table to an address of a different function.

Technique 1 above involves inserting program code within the code for the function. Technique 2 above involves re-directing a call to function f1( ) with a call to function f2( ). Typically, function f2( ) performs certain operations and then itself calls function f1( ). Alternatively, function f2( ) can include program code for f1( ) within itself. Technique 3 involves changing an address of function f1( ), used by a pointer, to an address of function f2( ). Again, function f2( ) can either perform operations and then itself call function f1( ), or else can include program code for function f1( ) within itself.

In several Microsoft Windows operating systems, when an application is executed, the system creates a look-up table in its process space, with addresses for each of the system functions called by the application. The present invention preferably identifies entries in the look-up table corresponding to functions that it patches, and replaces the addresses in the look-up table with addresses to other functions.

The present invention operates by patching system functions such as TextOut( ) and DrawText( ) so as to decode encrypted content prior to rasterization. In this way, the page itself never exists as a page with decrypted content on client computer 140 (FIG. 1), and, as such, protected original content is never exposed. If a user views a source listing for a page with protected text, the protected text shows up as encrypted text, which typically appears as gibberish. Similarly, if an application captures the page at any stage, the page includes the encrypted text. It is only upon display that protected original text appears.

Assignee's patent application U.S. Ser. No. 09/397,331, now U.S. Pat. No. 6,298,446, referenced hereinabove, describes protection of raster data displayed on a display device. Using the method and system described therein, graphical system functions such as BitBlt( ), StretchBlt( ), PlgBlt( ) and GetPixel( ) can be patched so that if an application performs a screen capture, the image that is actually captured is watermarked or else is a substitute image altogether. Thus by combining the present invention with the invention described in U.S. Ser. No. 09/397,331, original text can be protected both while it is on screen and while it is off screen.

In a preferred embodiment, for reasons of security the present invention is selective as to which device contexts it renders decrypted data to. For example, the present invention may be configured so as to render decrypted data to screen device contexts but not to render decrypted data to memory or printer device contexts. The permitted device contexts are preferably stored in a "white list," which the present invention accesses to determine whether or not to render decrypted data to a specific device context.

Additional Considerations

In reading the above description, persons skilled in the art will realize that there are many apparent variations that can be applied to the methods and systems described. Although the present invention has been described with reference to copy protection of text, it applies to other forms of data as well, including audio data, image data and video data. The present invention provides a general methodology to protect content of data that is rendered and formatted using patchable system calls.

For example, the present invention can be applied to image data by encrypting the data prior to its being saved or converted into a graphics format. On the receiving end, such data is rendered into a bitmap and then displayed by employing systems calls such as BitBlt( ) and StretchBlt( ). In a preferred embodiment, at the point at which the encrypted image data is passed to BitBlt( ) or StretchBlt( ) for display, the present invention decrypts the image data by patching the BitBlt( ) and StretchBlt( ) system functions.

Similarly, for audio data, the present invention preferably replaces such data with encrypted data, and only decodes the encrypted data when it is being rendered to a device for playing on an audio sound card.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of altering text for display in a formatted page, the method comprising:
    locating a memory buffer containing character strings and containing markers that delineate the character strings;
    locating an encrypted character string between two markers within the memory buffer;
    decoding the encrypted character string to obtain a decrypted character string, the decrypted character string having fewer characters than the encrypted text string;
    padding the decrypted character string with fill characters so that the padded decrypted character string has the same number of characters as the encrypted character string, wherein the fill characters are characters that are interpreted as non-visible characters by a text formatter that reads the character strings in the memory buffer and derives a page display format therefrom; and
    overwriting the encrypted character string with the padded decrypted character string in the memory buffer between the two markers.

2. The method of claim 1 wherein the first character string is a sequence of Unicode characters.

3. The method of claim 1 wherein each marker is a Unicode U+FFFE character.

4. The method of claim 1 wherein each marker is a Unicode U+FDEF character.

5. The method of claim 1 wherein said padding uses a Unicode U+200F character for at least one of the fill characters.

6. The method of claim 1 wherein said padding uses a Unicode U+200E character for at least one of the fill characters.

7. The method of claim 1 wherein said padding comprises padding the fill characters in front of the decrypted character string.

8. The method of claim 7 wherein said padding comprises padding a Unicode U+200E character adjacent to the decrypted character string, and padding Unicode U+200F characters for the remaining fill characters.

9. The method of claim 1 wherein the formatted page is a web page.

10. The method of claim 1 wherein the formatted page is a document page.

11. The method of claim 1 further comprising determining a display page layout based on the contents of the memory buffer.

12. A system capable of altering text for display in a formatted page, the system comprising:
    a memory buffer containing character strings and containing markers that delineate the character strings;
    a search processor locating an encrypted character string between two markers within the memory buffer;
    a decoder decoding the encrypted character string to obtain a decrypted character string, the decrypted character string having fewer characters than the encrypted text string; and
    a text processor padding the decrypted character string with fill characters so that the padded decrypted character string has the same number of characters as the encrypted character string, wherein the fill characters are characters that are interpreted as non-visible characters by a text formatter that reads the character strings in the memory buffer and derives a page display format therefrom, and overwriting the encrypted character string with the padded decrypted character string in the memory buffer between the two markers.

13. The system of claim 12 wherein the encrypted character string is a sequence of N Unicode characters.

14. The system of claim 12 wherein each marker is a Unicode U+FFFE character.

15. The system of claim 12 wherein each marker is a Unicode U+FDEF character.

16. The system of claim 12 wherein said text processor uses a Unicode U+200F character for at least one of the fill characters.

17. The system of claim 12 wherein said text processor uses a Unicode U+200E character for at least one of the fill characters.

18. The system of claim 12 wherein said text processor pads the fill characters in front of the decrypted character string.

19. The system of claim 18 wherein said text processor pads a Unicode U+200E character adjacent to the decrypted character string, and pads Unicode U+200F characters for the remaining fill characters.

20. The system of claim 12 wherein the formatted page is a web page.

21. The system of claim 12 wherein the formatted page is a document page.

22. The system of claim 12 further comprising a display layout processor determining a display page layout based on the contents of the memory buffer.

23. A computer-readable storage medium storing program code for causing a computer to perform the steps of:
    locating a memory buffer containing character strings and containing markers that delineate the character strings;
    locating an encrypted character string between two markers within the memory buffer;
    decoding the encrypted character string to obtain a decrypted character string, the decrypted character string having fewer characters than the encrypted text string;
    padding the decrypted character string with fill characters so that the padded decrypted character string has the same number of characters as the encrypted character string, wherein the fill characters are characters that are interpreted as non-visible characters by a text formatter that reads the character strings in the memory buffer and derives a page display format therefrom; and
    overwriting the encrypted character string with the padded decrypted character string in the memory buffer between the two markers.

* * * * *

UNITED STATES PATENT AND TRADEMARK OFFICE
CERTIFICATE OF CORRECTION

| | |
|---|---|
| PATENT NO. | : 7,657,759 B2 |
| APPLICATION NO. | : 11/169823 |
| DATED | : February 2, 2010 |
| INVENTOR(S) | : Moshe Rubin and Daniel Schreiber |

It is certified that error appears in the above-identified patent and that said Letters Patent is hereby corrected as shown below:

On the Title Page

Please add -

Item (30)  Foreign Application Priority Data

Nov. 16, 1998  (IL) ........................................ 127093
Dec. 30, 1998  (IL) ........................................ 127869

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

PATENT NO. : 7,657,759 B2
APPLICATION NO. : 11/169823
DATED : February 2, 2010
INVENTOR(S) : Moshe Rubin et al.

It is certified that error appears in the above-identified patent and that said Letters Patent is hereby corrected as shown below:

This certificate supersedes the Certificate of Correction issued October 4, 2011. The Certificate is vacated since Petition to accept unintentionally delayed claim of priority under 37 C.F.R. 1.55(c) was dismissed. The Certificate of Correction should not have been issued for this patent.

Signed and Sealed this
Twentieth Day of March, 2012

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,657,759 B2
APPLICATION NO. : 11/169823
DATED : February 2, 2010
INVENTOR(S) : Moshe Rubin and Daniel Schreiber It is certified that error appears in the above-identified patent and that said Letters Patent is hereby corrected as shown below:

On the Title Page

Please add -

Item (30)   Foreign Application Priority Data

Nov. 16, 1998  (IL) ......................................... 127093
Dec. 30, 1998  (IL) ......................................... 127869

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,657,759 B2 | |
| APPLICATION NO. | : 11/169823 | |
| DATED | : February 2, 2010 | |
| INVENTOR(S) | : Moshe Rubin et al. | |

It is certified that error appears in the above-identified patent and that said Letters Patent is hereby corrected as shown below:

On the Title page, Related U.S. Application Data, section (63) please delete:

"Continuation of application No. 09/996,623, filed on Nov. 28, 2001, now Pat. No. 6,993,662, which is a continuation-in-part of application No. 09/774,236, filed on Jan. 29, 2001, which is a continuation-in-part of application No. 09/397,331, file don Sep. 14, 1999, now Pat. No. 6,298,446."

and add

-- Continuation of application No. 09/996,623, filed on Nov. 28, 2001, now Pat. No. 6,993,662, which is a continuation-in-part of application No. 09/774,236, filed on Jan. 29, 2001, which is a continuation-in-part of application No. 09/397,331, filed on Sep. 14, 1999, now Pat. No. 6,298,446, which is a continuation-in-part of application No. 09/313,067, filed on May 17, 1999, now Pat. No. 6,209,103. --

On the Title page, Foreign Application Priority Data, section (30) please add:

-- Jun. 14, 1998    (IL)    124895 --

In the Specification, Column 1 line 8, please delete: "This application is a continuation of and incorporates by reference assignee's application U.S. Ser. No. 09/996,623, now U.S. Pat. No. 6,993,662, filed on Nov. 28, 2001 and entitled "Method and System for Copy Protection of Displayed Data Content." This application is a continuation-in-part of assignee's pending application U.S. Ser. No. 09/774,236, filed on Jan. 29, 2001 and entitled "Method and System for Copy Protection of Data Content," which is a continuation-in-part of assignee's application U.S. Ser. No. 09/397,331, now U.S. Pat. No. 6,298,446, filed on Sep. 14, 1999 and entitled "Method and System for Copyright Protection of Digital Images Transmitted over Networks."

and add
-- This application is a continuation of commonly-owned U.S. application Ser. No. 09/996623, now Signed and Sealed this
Twenty-sixth Day of March, 2013

Teresa Stanek Rea
*Acting Director of the United States Patent and Trademark Office*

U.S. Pat. No. 6,993,662, filed on November 28, 2001, entitled "Method and System for Copy Protection of Displayed Data Content," which is a continuation-in-part of U.S. application 09/774236, filed on January 29, 2001, now abandoned, which is a continuation-in-part of U.S. application 09/397331 filed on September 14, 1999, now issued as U.S. patent 6,298,446, which claims priority to Israeli patents IL 127093, filed on Nov. 16, 1998, and IL 127869, filed on Dec. 30, 1998, and is a continuation-in-part of U.S. application 09/313067, now U.S. Pat. No. 6,209,103, filed on May 17, 1999, entitled "Methods And Apparatus For Preventing Reuse of Text, Images And Software Transmitted Via Networks" which, in turn, claims priority to Israeli patent IL 124895, filed Jun. 14, 1998. --